(12) United States Patent
Michaeli et al.

(10) Patent No.: US 12,347,238 B2
(45) Date of Patent: Jul. 1, 2025

(54) DEEPFAKE DETECTION USING SYNCHRONOUS OBSERVATIONS OF MACHINE LEARNING RESIDUALS

(71) Applicant: ORACLE INTERNATIONAL CORPORATION, Redwood Shores, CA (US)

(72) Inventors: Guy G. Michaeli, Seattle, WA (US); Mandip S. Bhuller, San Carlos, CA (US); Timothy D. Cline, Gainesville, VA (US); Kenny C. Gross, Escondido, CA (US)

(73) Assignee: Oracle International Corporation, Redwood Shores, CA (US)

( * ) Notice: Subject to any disclaimer, the term of this patent is extended or adjusted under 35 U.S.C. 154(b) by 348 days.

(21) Appl. No.: 17/967,254

(22) Filed: Oct. 17, 2022

(65) Prior Publication Data
US 2024/0127630 A1    Apr. 18, 2024

(51) Int. Cl.
*G06V 40/40* (2022.01)
*G06V 10/764* (2022.01)
(Continued)

(52) U.S. Cl.
CPC ............ *G06V 40/40* (2022.01); *G06V 10/764* (2022.01); *G06V 10/774* (2022.01); *G06V 20/41* (2022.01);
(Continued)

(58) Field of Classification Search
None
See application file for complete search history.

(56) References Cited

U.S. PATENT DOCUMENTS

| 4,686,655 A | 8/1987 | Hyatt |
| 7,020,802 B2 | 3/2006 | Gross et al. |

(Continued)

FOREIGN PATENT DOCUMENTS

| CN | 110619618 A | * 12/2019 | ........... G06T 7/0004 |
| CN | 110941020 A1 | 3/2020 | |

(Continued)

OTHER PUBLICATIONS

Patent Cooperation Treaty (PCT): "International Search Report and Written Opinion", issued in PCT International Application No. PCT/US2023/033576 (International Filing Date Sep. 25, 2023) having a date of mailing of Jan. 18, 2024 (10 pages).

(Continued)

*Primary Examiner* — John Villecco
*Assistant Examiner* — Joshua B. Crockett
(74) *Attorney, Agent, or Firm* — Kraguljac Law Group LLC

(57) ABSTRACT

Systems, methods, and other embodiments associated with computer deepfake detection are described. In one embodiment, a method includes converting audio-visual content of a person delivering a speech into a set of time series signals. Residual time series signals of residuals that indicate an extent to which the time series signals differ from machine learning estimates of authentic delivery of the speech by the person are generated. Residual values from one synchronous observation of the residual time series signals are placed into an array of residual values for a point in time. A sequential analysis of the residual values of the array is performed to detect an anomaly in the residual values for the point in time. In response to detection of the anomaly, an alert that deepfake content is detected in the audio-visual content is generated.

20 Claims, 6 Drawing Sheets

(51) Int. Cl.
*G06V 10/774* (2022.01)
*G06V 20/40* (2022.01)
*G06V 40/16* (2022.01)
*G10L 17/10* (2013.01)
*G10L 17/18* (2013.01)
*G10L 17/26* (2013.01)

(52) U.S. Cl.
CPC ............ *G06V 20/46* (2022.01); *G06V 40/168* (2022.01); *G06V 40/172* (2022.01); *G10L 17/18* (2013.01); *G10L 17/26* (2013.01); *G10L 17/10* (2013.01)

(56) References Cited

U.S. PATENT DOCUMENTS

| | | |
|---|---|---|
| 7,191,096 B1 | 3/2007 | Gross et al. |
| 7,281,112 B1 | 10/2007 | Gross et al. |
| 7,292,659 B1 | 11/2007 | Gross et al. |
| 7,391,835 B1 | 6/2008 | Gross et al. |
| 7,542,995 B2 | 6/2009 | Thampy et al. |
| 7,573,952 B1 | 8/2009 | Thampy et al. |
| 7,613,576 B2 | 11/2009 | Gross et al. |
| 7,613,580 B2 | 11/2009 | Gross et al. |
| 7,702,485 B2 | 4/2010 | Gross et al. |
| 7,869,977 B2 | 1/2011 | Lewis et al. |
| 8,055,594 B2 | 11/2011 | Dhanekula et al. |
| 8,069,490 B2 | 11/2011 | Gross et al. |
| 8,150,655 B2 | 4/2012 | Dhanekula et al. |
| 8,200,991 B2 | 6/2012 | Vaidyanathan et al. |
| 8,214,682 B2 | 7/2012 | Madyanathan et al. |
| 8,275,738 B2 | 9/2012 | Gross et al. |
| 8,341,759 B2 | 12/2012 | Gross et al. |
| 8,365,003 B2 | 1/2013 | Gross et al. |
| 8,452,586 B2 | 5/2013 | Master et al. |
| 8,457,913 B2 | 6/2013 | Zwinger et al. |
| 8,543,346 B2 | 9/2013 | Gross et al. |
| 9,093,120 B2 | 7/2015 | Bilobrov |
| 9,514,213 B2 | 12/2016 | Wood et al. |
| 9,911,336 B2 | 3/2018 | Schlechter et al. |
| 9,933,338 B2 | 4/2018 | Noda et al. |
| 10,015,139 B2 | 7/2018 | Gross et al. |
| 10,452,510 B2 | 10/2019 | Gross et al. |
| 10,496,084 B2 | 12/2019 | Li et al. |
| 10,860,011 B2 | 12/2020 | Gross et al. |
| 10,929,776 B2 | 2/2021 | Gross et al. |
| 11,055,396 B2 | 7/2021 | Gross et al. |
| 11,255,894 B2 | 2/2022 | Wetherbee et al. |
| 11,392,786 B2 | 7/2022 | Gross et al. |
| 2003/0061008 A1 | 3/2003 | Smith et al. |
| 2004/0258154 A1 | 12/2004 | Liu |
| 2007/0288242 A1 | 12/2007 | Spengler et al. |
| 2008/0140362 A1 | 6/2008 | Gross et al. |
| 2008/0252309 A1 | 10/2008 | Gross et al. |
| 2008/0252441 A1 | 10/2008 | McElfresh et al. |
| 2008/0256398 A1 | 10/2008 | Gross et al. |
| 2009/0099830 A1 | 4/2009 | Gross et al. |
| 2009/0125467 A1 | 5/2009 | Dhanekula et al. |
| 2009/0306920 A1 | 12/2009 | Zwinger et al. |
| 2010/0023282 A1 | 1/2010 | Lewis et al. |
| 2010/0033386 A1 | 2/2010 | Lewis et al. |
| 2010/0161525 A1 | 6/2010 | Gross et al. |
| 2010/0305892 A1 | 12/2010 | Gross et al. |
| 2010/0306165 A1 | 12/2010 | Gross et al. |
| 2012/0030775 A1 | 2/2012 | Gross et al. |
| 2012/0111115 A1 | 5/2012 | Ume et al. |
| 2012/0245978 A1 | 9/2012 | Jain et al. |
| 2013/0157683 A1 | 6/2013 | Lymberopoulos et al. |
| 2015/0137830 A1 | 5/2015 | Keller, III et al. |
| 2016/0098561 A1 | 4/2016 | Keller et al. |
| 2017/0163669 A1 | 6/2017 | Brown et al. |
| 2018/0011130 A1 | 1/2018 | Aguayo Gonzalez et al. |
| 2018/0276044 A1 | 9/2018 | Fong et al. |
| 2018/0349797 A1 | 12/2018 | Garvey et al. |
| 2019/0102718 A1 | 4/2019 | Agrawal |
| 2019/0163719 A1 | 5/2019 | Gross et al. |
| 2019/0196892 A1 | 6/2019 | Matei et al. |
| 2019/0197145 A1 | 6/2019 | Gross et al. |
| 2019/0237997 A1 | 8/2019 | Tsujii et al. |
| 2019/0243799 A1 | 8/2019 | Gross et al. |
| 2019/0286725 A1 | 9/2019 | Gawlick et al. |
| 2019/0378022 A1 | 12/2019 | Wang et al. |
| 2020/0125819 A1 | 4/2020 | Gross et al. |
| 2020/0201950 A1 | 6/2020 | Wang et al. |
| 2020/0387753 A1 | 12/2020 | Brill et al. |
| 2021/0081573 A1 | 3/2021 | Gross et al. |
| 2021/0158202 A1 | 5/2021 | Backlawski et al. |
| 2021/0174248 A1 | 6/2021 | Wetherbee et al. |
| 2021/0270884 A1 | 9/2021 | Wetherbee et al. |
| 2022/0121868 A1 | 4/2022 | Chen et al. |
| 2022/0121955 A1 | 4/2022 | Chavoshi et al. |
| 2022/0138472 A1* | 5/2022 | Mittal .................... G06N 3/045 382/181 |
| 2024/0089371 A1* | 3/2024 | Lohar .................... H04M 3/436 |

FOREIGN PATENT DOCUMENTS

| | | |
|---|---|---|
| DE | 4447288 A1 | 7/1995 |
| IN | 107181543 A1 | 9/2017 |

OTHER PUBLICATIONS

Pavel Korshunov et al.: "Tampered Speaker Inconsistency Detection with Phonetically Aware Audio-visual Features", retrieved from the Internet: URL:https://publications.idiap.ch/downloads/papers/2019/Korshunov_AVFAKESIMCL_2019.pdf dated Jul. 16, 2019 (retrieved from Internet on Aug. 26, 2020) (5 pgs).

Yisroel Mirsky et al.: "The Creation and Detection of Deepfakes: A Survey", arxi.org, Cornell University Library, 201 Olin Library Cornell University, Ithaca, NY 14852, dated May 13, 2020 (36 pgs).

Zhou, Yipin et al.: "Joint Audio-Visual Deepfake Detection", 2021 IEEE/CVF International Conference on Computer Vision (ICCV), IEEE, dated Oct. 10, 2021 (pp. 14780-14789).

Garcia-Martin Eva et al., "Estimation of Energy Consumption in Machine Learning," Journal of Parallel and Distributed Computing, Elsevier, Amsterdam, NL, vol. 134, Aug. 21, 2019 (Aug. 21, 2019), pp. 77-88.

Patent Cooperation Treaty (PCT), International Search Report and Written Opinion issued in PCT International Application No. PCT/US2020/060083 having a date of mailing of Mar. 19, 2021 (13 pgs).

Patent Cooperation Treaty (PCT), International Search Report and Written Opinion issued in PCT International Application No. PCT/US2021/015802 having a date of mailing of May 28, 2021 (13 pgs).

Patent Cooperation Treaty (PCT), International Search Report and Written Opinion issued in PCT International Application No. PCT/US2021/013633 having a date of mailing of May 6, 2021 (10 pgs).

Huang H, et al. "Electronic counterfeit detection based on the measurement of electromagnetic fingerprint," Microelectronics Reliability: an Internat . Journal & World Abstracting Service, vol. 55, No. 9, Jul. 9, 2015 (Jul. 9, 2015) pp. 2050-2054.

Bouali Fatma et al. "Visual mining of time series using a tubular visualization," Visual Computer, Springer, Berlin, DE, vol. 32, No. 1, Dec. 5, 2014 (Dec. 5, 2014), pp. 15-30.

Patent Cooperation Treaty (PCT), International Search Report and Written Opinion issued in PCT International Application No. PCT/US2021/014106 having a date of mailing of Apr. 26, 2021 (9 pgs).

Patent Cooperation Treaty (PCT), International Search Report and Written Opinion issued in PCT International Application No. PCT/US2021/015359 having a date of mailing of Apr. 9, 2021 (34 pgs).

Dickey et al.; Checking for Autocorrelation in Regression Residuals; pp. 959-965; Proceedings of 11th Annual SAS Users Group International Conference; 1986.

Hoyer et al.; Spectral Decomposition and Reconstruction of Nuclear Plant Signals; pp. 1153-1158; published Jan. 1, 2005; downloaded on Jul. 14, 2021 from: https://support.sas.com/resources/papers/proceedings-archive/SUGI93/Sugi-93-193%20Hoyer%20Gross.pdf.

(56) References Cited

OTHER PUBLICATIONS

Gou, Yuhua, "Implementation of 3d Kiviat Diagrams." (2008). (Year: 2008).

Wang, Ray C., et al., Process Fault Detection Using Time-Explicit Kiviat Diagrams. AlChE Journal 61.12 (2015): 4277-4293.

US Patent and Trademark Office, "Non-Final Office Action", issued in U.S. Appl. No. 16/804,531 having a date of mailing of Jul. 20, 2021 (51 pgs).

Whisnant et al.; "Proactive Fault Monitoring in Enterprise Servers," IEEE—International Multiconference in Computer Science & Computer Engineering (Jun. 27-30, 2005) 11 pgs.

US Nuclear Regulatory Commission; "Technical Review of On-Line Monitoring Techniques for Performance Assessment," vol. 1, Jan. 31, 2006.

Gribok, et al,. "Use of Kernel Based Techniques for Sensor Validation in Nuclear Power Plants," International Topical Meeting on Nuclear Plant Instrumentation, Controls, and Human-Machine Interface Technologies (NPIC & HMIT 2000), Washington, DC, Nov. 2000, pp. 1-15.

Singer, et al., "Model-Based Nuclear Power Plant Monitoring and Fault Detection: Theoretical Foundations," Intelligent System Application to Power Systems (ISAP '97), Jul. 6-10, 1997, Seoul, Korea pp. 60-65.

Wald, A, "Sequential Probability Ratio Test for Reliability Demonstration", John Wiley & Sons, 1947.

Patent Cooperation Treaty (PCT), International Search Report and Written Opinion issued in PCT International Application No. PCT/US2021/062380 having a date of mailing of May 24, 2022 (10 pgs).

Mishra, Commentary "Deep Fakes: The Next Digital Weapon with Worrying Implications for Nuclear Policy", European Leadership Network, Nov. 3, 2021 (4 pgs).

Tech & Science Dictionary, Meaning and Origin "deepfake", dictionary.com Jan. 9, 2020 (9 pgs).

Gross, Kenny, Oracle Labs; MSET2 Overview: "Anomaly Detection and Prediction" Oracle Cloud Autonomous Prognostics; p. 1-58; Aug. 8, 2019.

Gross, K. C. et al., "Application of a Model-Based Fault Detection System to Nuclear Plant Signals," downloaded from https://www.researchgate.net/publication/236463759; Conference Paper: May 1, 1997, 5 pages.

Abebe Diro et al.; A Comprehensive Study of Anomaly Detection Schemes in IoT Networks Using Machine Learning Algorithms; pp. 1-13; 2021; downloaded from: https://doi.org/10.3390/s21248320.

Zhenlong Xiao, et al.; Anomalous IoT Sensor Data Detection: An Efficient Approach Enabled by Nonlinear Frequency-Domain Graph Analysis; IEEE Internet of Things Journal, Aug. 2020; pp. 1-11.

Gross Kenny et al: "AI Decision Support Prognostics for IoT Asset Health Monitoring, Failure Prediction, Time to Failure", 2019 International Conference on Computational Science and Computational Intelligence (CSCI), IEEE, Dec. 5, 2019, pp. 244-248.

Paulraj, et al; "Moving Vehicle Recognition and Classification Based on Time Domain Approach", Malaysian Technical Universities Conference on Engineering & Technology, MUCET 2012, Part 1—Electronic and Electrical Engineering, Procedia Engineering 53, pp. 405-410 (https:\\www.sciencedirect.com).

Seyerlehner, Klaus et al., "Frame Level Audio Similarity—A Codebook Approach", Proc. of the 11th Int. Conference on Digital Audio Effects (DAFx-08), Espoo, Finland, Sep. 1-4, 2008 (8 pgs).

Casey, et al.; "Audio Shingling for Measuring Musical Similarity", Purdue University—Engineering 2006 pp. 1-8.

Choi Kukjin et al: "Deep Learning for Anomaly Detection in Time-Series Data: Review, Analysis, and Guidelines", IEEE Access, IEEE, USA, vol. 9, Aug. 26, 2021, (23 pgs).

\* cited by examiner

DEEPFAKE DETECTION USING SYNCHRONOUS OBSERVATIONS OF MACHINE LEARNING RESIDUALS

BACKGROUND

A "deepfake" is a video in which the face and/or voice of a person has been manipulated using artificial intelligence (AI) software in a way that makes the altered video look authentic. High-fidelity deepfakes are a growing concern. Deepfakes may represent a person as saying or doing something that the person did not say or do. It is possible that malicious actors may inject deepfake content into live video/audio streams. This presents an international security hazard, for example where national or international leaders may be speaking a live communication or broadcast, and be made to appear and sound as if the leader is saying something that would upset world markets or disrupt international stability.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments one element may be implemented as multiple elements or that multiple elements may be implemented as one element. In some embodiments, an element shown as an internal component of another element may be implemented as an external component and vice versa. Furthermore, elements may not be drawn to scale.

DETAILED DESCRIPTION

Figure 1:
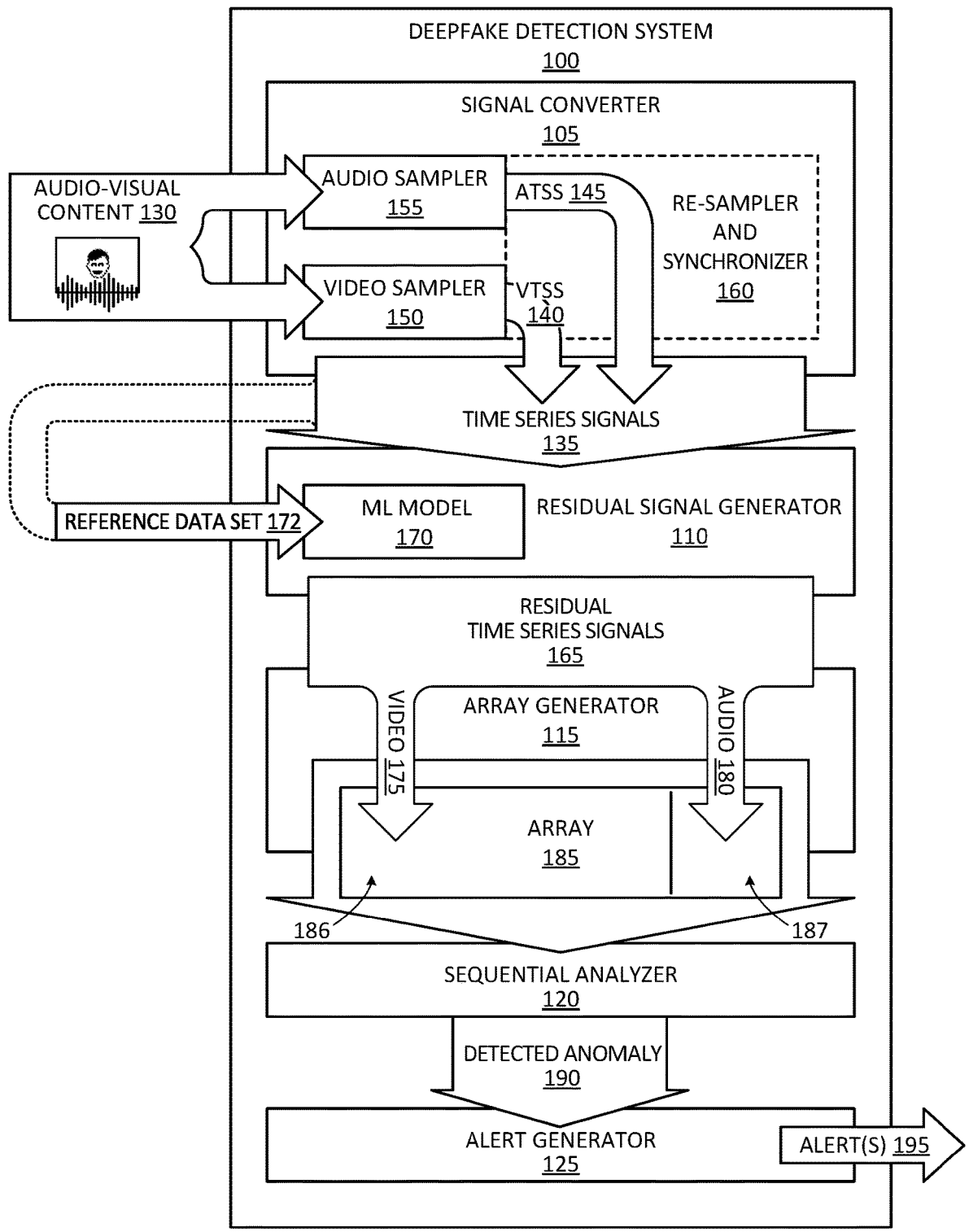
FIG. 1 illustrates one embodiment of a deepfake detection system associated with autonomous deepfake detection.

Systems and methods are described herein that provide autonomous deepfake detection based on multivariate spatiotemporal characterization and analysis of video and integrated audio. In one embodiment, a deepfake detection system autonomously detects deepfake modifications to audio-visual content. In one embodiment, the deepfake detection system detects deepfake content at a point in time in audio-visual content based on an analysis of residual values for the point in time. In one embodiment, a deepfake detection system detects deepfake content with a moment-by-moment two-dimensional analysis of video and audio of a human speaker. For example, the deepfake detection system analyzes a two-dimensional matrix of residuals between ML-estimated and actual values of audio-visual content for one point in time with a two-dimensional sequential analysis to detect anomalies in the residuals. The ML-estimated values are consistent with authentic speech by the human speaker. An anomaly in the residuals indicates the presence of deepfake content.

In one embodiment, an audio-visual content including speech by a human speaker is converted into two groups of time series signals: a video set that represents video content in the audio-visual content, and an audio set that represents audio content in the audio-visual content. An ML model generates estimates for both sets of time series signals that are consistent with authentic speech by the human speaker. Residual time series signals are generated from the time series signals and the estimates. The residuals in the residual time series signals indicate an extent to which a value in a time series signal deviates from estimated value consistent with authentic speech.

One synchronous observation of the residual time signals—in other words, a one-observation-thick slice across all the residual signals at one point in time—selects a residual value from each signal. For example, an observation in one time series signal is synchronous with an observation in another time series signal when the observations are concurrent, appearing at corresponding time stamps in the respective time series signals. The selected residual values are placed into a two-dimensional array representing a frame of the audio-visual content. In the two-dimensional array, values from residual time series signals corresponding to video time series signals are placed in a video partition of the two-dimensional array, and values from residual time series signals corresponding to audio time series signals are placed in an audio partition of the two-dimensional array. Sequential analyses for anomaly detection are performed for individual rows and columns of the two-dimensional array, thus analyzing the residuals in two dimensions across the synchronous observation or frame. Where any of the sequential analyses detect an anomaly, an alert indicating the presence of deepfake content is generated. This process may repeat as a loop for a series of synchronous observations, analyzing the audio-visual content frame by frame in two dimensions to detect deepfake modification to the speech or video of the human speaker.

As used herein, the term "time series signal" refers to a data structure in which a series of data points (such as observations or sampled values) are indexed in time order. In one embodiment, the data points of a time series signal may be indexed with a time stamp and/or an observation number. In one embodiment, data points of a time series signal recur at a uniform or consistent interval. In one embodiment, data points of a time series recur at irregular, non-uniform, or inconsistent intervals, and then may be preprocessed with analytical resampling to make uniform or consistent intervals, as discussed in further detail below for example with reference to re-sampler and synchronizer 160 and under the heading "Resampling Time Series at a Uniform Rate."

As used herein, the term "time series database" refers to a data structure that includes one or more time-series signals sharing an index (such as a series of time stamps, positions, or observation numbers) in common.

As used herein, the term "residual" refers to the difference between a value (such as a sampled or resampled value) and an ML prediction or ML estimate of what the value is expected to be by an ML model. Thus, a residual time series signal refers to a time series of residual values between a time series of actual values and a time series of ML estimates for the values.

As used herein, the term "audio-visual content" refers to video with integrated audio. As used herein, the term "audio-video signal" (or "audio-visual signal") refers to the stream of information used to carry audio-visual content.

In one embodiment, deepfake detection systems and methods as shown and described herein enable real-time analysis of live streaming audio-video for deepfake content at fine resolution. This is so because, in one embodiment, the deepfake detection systems and methods shown and described herein parallelize naturally to multi-thread, multi-core CPUs and GPUs, while other deepfake detection approaches such as neural networks and support vector machines cannot be parallelized due to stochastic optimization of the weights. In one embodiment, the ability to analyze the audio-video at fine resolutions in real time enables more accurate and more sensitive identification of deepfake content.

No action or function described or claimed herein is performed by the human mind. An interpretation that any action or function can be performed in the human mind is inconsistent with and contrary to this disclosure.

—Example Deepfake Detection System—

FIG. 1 illustrates one embodiment of a deepfake detection system 100 associated with autonomous deepfake detection based on multivariate spatiotemporal characterization and analysis of video and integrated audio. In Deepfake detection system 100 includes signal converter 105, a residual signal generator 110, an array generator 115, a two-dimensional sequential analyzer 120, and an alert generator 125. In one embodiment each of these components 105, 110, 115, 120, and 125 (and their respective sub-components) of deepfake detection system 100 may be implemented as software modules.

In one embodiment, audio-visual content 130 may be received from an audio-visual content source. In one embodiment, signal converter 105 is configured to convert audio-visual content 130 that includes speech by a human speaker into a set of time series signals 135. In this way, audio-visual content of a person delivering a speech may be represented with a set of time series signals. Set of time series signals 135 includes a video subset of time series signals 140 for the video and an audio subset of time series signals 145 for the audio. In one embodiment, signal converter 105 includes a video sampler 150. Video sampler 150 is configured to convert the audio-visual content 130 into the video subset of time series signals 140 by sampling time series signals from pixels of a frame of video in the audio-visual content 130. Signal converter 105 includes an audio sampler 155. Audio sampler 155 is configured to convert the audio-visual content 130 into the audio subset of time series signals 145 by sampling time series signals from frequency ranges of sound in the audio signal. In one embodiment, signal converter 105 includes re-sampler and synchronizer 160. Re-sampler and synchronizer 160 is configured to resample one or more of the time series signals to cause the set of time series signals 135 to be sampled at a uniform rate. Re-sampler and synchronizer 160 is also configured to phase shift the time series signals to cause the observations of the signals to be synchronized. The resampled, synchronized set of time series signals 135 is provided to residual signal generator 110.

In one embodiment, residual signal generator 110 is configured to generate a set of residual time series signals 165 between the set of time series signals 135 and a set of estimates for the time series signals made by a machine learning model 170. In this way, residual time series signals of residuals that indicate an extent to which the time series signals differ from machine learning estimates of authentic delivery of the speech by the person may be generated. Machine learning model 170 is trained or configured to generate the estimates to be consistent with authentic speech by the human speaker. In one embodiment, the machine learning model is trained on a reference data set 172 of time series signals representative of authentic speech by the human speaker. Reference data set 172 may be time series signals of the human speaker delivering a prior speech that is known to be authentic, or an early segment of time series signals 135 designated to be representative of authentic speech. Set of residual time series signals 165 includes a video subset 175 of residual time series signals that are calculated from the subset of video signals 140 and the model-generated estimates for the subset of video signals. Set of residual time series signals 165 also includes an audio subset 180 of residual time series signals calculated from the subset of audio signals 145 and the model-generated estimates for the subset of audio signals. Set of residual time series signals 165 is provided to array generator 115.

In one embodiment, array generator 115 is configured to place residual values from one synchronous observation of the set of residual time series signals into an array 185. In this way, residual values from one synchronous observation (at a point in time) of the residual time series signals may be placed into an array of residual values for the point in time. Array 185 is divided into a video partition 186 and an audio partition 187. Residual values at the synchronous observation that were generated for the video subset 175 are placed within the video partition 186. Residual values at the synchronous observation that were generated for the audio subset 187 are placed in the audio partition 187. In one embodiment, array 185 is two-dimensional or rectangular. In one embodiment, two-dimensional array 185 is a data structure of values arranged in rows along a first (e.g., horizontal) dimension and columns along a second (e.g., vertical) dimension. In one embodiment, two-dimensional array 185 is divided along a larger dimension into the video partition 186 and the audio partition 187. In one embodiment, the two-dimensional array 185 has a smaller dimension of a size that encompasses a smaller dimension of a pixel grid for a frame of video in the audio-visual content. In one embodiment, the two-dimensional array 185 has a larger dimension that encompasses both a number of columns in the audio partition and a larger dimension of the pixel grid multiplied by a number of color channels per pixel. In one embodiment, array generator 115 is configured to place the residual values generated for the video subset 175 into the video partition in cells corresponding to a location of the pixel within the pixel grid. Array 185 is provided to sequential analyzer 120.

In one embodiment, sequential analyzer 120 is configured to perform a sequential analysis of the residual values of the array to detect an anomaly in the residual values at a point in time. In one embodiment, sequential analyzer 120 is a two-dimensional (2D) sequential analyzer configured to perform a sequential analysis of the residual values across two dimensions of the rectangular array 185 to detect an anomaly in the residual values in the array. In one embodiment, 2D sequential analyzer 120 is configured to perform the sequential analysis for the larger dimension along one or more rows in the larger dimension of the rectangular array 185. An individual row in the larger dimension of the rectangular array 185 includes cells in both the video partition 186 and the audio partition 187 of the rectangular array 185. In one embodiment, sequential analyzer 120 is configured to perform sequential probability ratio testing on the residual values in the array to detect one or more anomalies in the residual values. In one embodiment, 2D sequential analyzer 120 is configured to perform sequential probability ratio tests across rows and columns of the rectangular array 185. In one embodiment, 2D sequential analyzer 120 is configured to use parallel processors to simultaneously perform the sequential probability ratio tests across rows and columns of the rectangular array 185. In one embodiment, 2D sequential analyzer 120 is configured to detect an anomaly 190 when any one of the sequential probability ratio tests across rows or columns identifies an anomalous residual. A report of the detected anomaly 190 is provided to alert generator 125.

In one embodiment, alert generator 125 is configured to, in response to detection of the anomaly 190, generate an alert 195 that deepfake content that misrepresents the human speaker or the speech is detected in the audio-visual content 130. Thus, an alert that deepfake content is detected in the audio-visual content may be generated.

Further details regarding deepfake detection system 100 are presented herein. In one embodiment, the operation of deepfake detection system will be described with reference to example deepfake detection methods shown in FIG. 2. In one embodiment, the configuration and use of rectangular array 185 will be described with reference to the diagram of the rectangular array for one observation shown in FIG. 3. In one embodiment, the operation of the 2D sequential analyzer 120 on a rectangular array will be described with reference to FIGS. 3 and 4A-4C. In one embodiment, an additional example method for deepfake detection will be shown and described with reference to FIG. 5.

Figure 2:
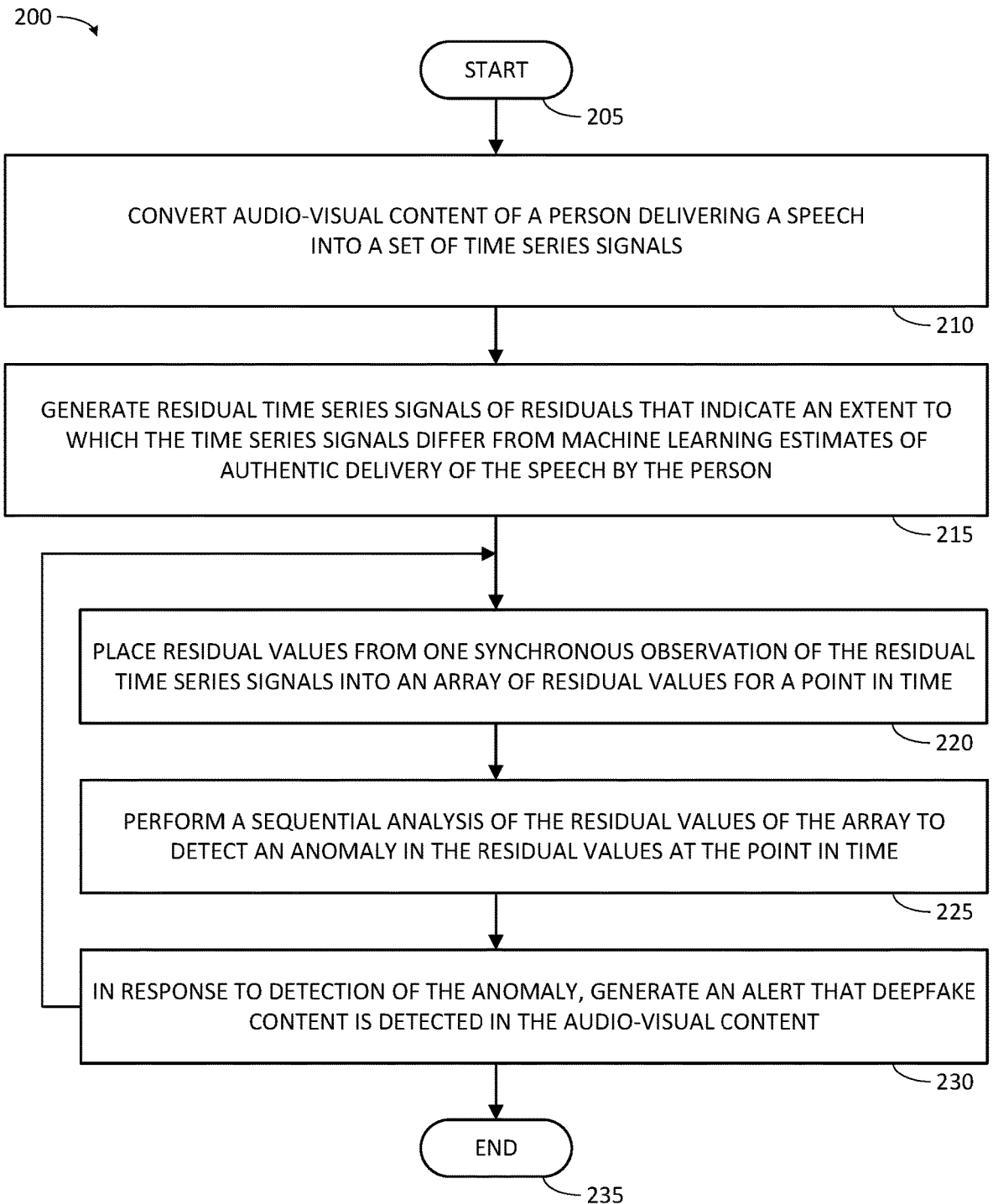
FIG. 2 illustrates one embodiment of a deepfake detection method associated with autonomous deepfake detection.

FIG. 2 illustrates one embodiment of a deepfake detection method 200 associated with autonomous deepfake detection based on multivariate spatiotemporal characterization and analysis of video and integrated audio. Multivariate spatiotemporal characterization of video and integrated audio refers to individual description of many discrete portions of audio-visual content as variables in a spatial structure (such as an array) over a sequence of discrete points in time, as described herein. Multivariate spatiotemporal analysis of video and integrated audio refers to examination of the discrete portions of audio-visual content over dimensions of the array structure at synchronous observations, as described herein.

As an overview, in one embodiment, deepfake detection method 200 converts audio-video of a human talking into a set of time series signals. In this conversion, the audio and video are converted into discrete audio and video subsets of the set of time series signals. A machine learning model generates estimates for the set of time series signals of what the time series signals should be if they are consistent with authentic speech by the human speaker. From the time series signals and the estimates, residual time series signals are generated that represent an extent of deviation by a signal from values consistent with authentic speech. The residual signals are then analyzed one observation (or frame) at a time to detect anomalies: one synchronous observation of residual values from all the residual signals are placed into a rectangular array, analyzed sequentially across two dimensions of the rectangular array to detect anomalies, and, where an anomaly is detected, an alert is generated that indicates the presence of deepfake content in the audio-visual content.

In one embodiment, deepfake detection method 200 initiates at start block 205 in response to a processor of a computer determining one or more of: (i) an incoming stream or broadcast of an audio-visual content containing a human speaking has been detected; (ii) that an instruction to perform deepfake detection method 200 on an audio-visual content containing a human speaking has been received (iii) a user or administrator of deepfake detection system 100 has initiated deepfake detection method 200; (iv) it is currently a time at which deepfake detection method 200 is scheduled to be run; or (v) that deepfake detection method 200 should commence in response to occurrence of some other condition. In one embodiment, the computer is configured by computer-executable instructions to execute functions of deepfake detection system 100. Following initiation at start block 205, deepfake detection method 200 continues to process block 210.

At process block 210, deepfake detection method 200 converts audio-visual content of a person delivering a speech into a set of time series signals. For example, deepfake detection method 200 converts an audio-visual signal that includes speech by a human speaker into a set of time series signals that includes a video subset of time series signals for the video and an audio subset of time series signals for the audio. Following the conversion, the audio-visual content is represented by time series of values sampled from the audio-visual content, such as synchronous, uniformly sampled database of time series signals TSS as discussed below. In one embodiment, the functions of process block 210 are performed by signal converter 105.

In one embodiment, deepfake detection method 200 converts audio-visual content into time series signals by sampling values from the audio-visual content at intervals. Sampling observes or detects a value of a particular portion of the audio-visual content at a particular point in time. In one embodiment, the particular portions of the audio-visual content include pixels of a video frame and ranges of audio frequency for a sound waveform. The sampled value is placed into a time series signal for the particular portion of the audio-visual content in a position for the particular point in time. The sampling of the value is repeated after the interval. The new value for the particular portion is placed into a subsequent position of the time series signal for the particular portion of the audio-visual content.

Thus, in one embodiment, a series of values may be sampled at the interval from pixels of the video frame and from audio frequency ranges in the sound waveform to create time series signals for each pixel and each audio frequency range. In one embodiment, sampling of the video frame may be performed by video sampler 150 to produce video time series signals 140. In one embodiment, sampling of the audio frequency ranges may be performed by audio sampler 155 to produce audio time series signals 145.

Red/green/blue (RGB) intensity values may be sampled from each pixel of a video frame in the audio-visual content. The intensity values are values that indicate level of brightness of a color channel. The intensity values may range between least brightness and greatest brightness of the color channel, for example integers ranging between 0 (least brightness or no output) and 255 (greatest brightness or full output).

Amplitude values may be sampled from ranges of audio frequency for a sound waveform in the audio-visual content. The amplitude values are values that indicate loudness of sound within an audio frequency range. Because the audio frequency range (or bin) may include multiple frequencies within the sound waveform, the amplitude value for the audio frequency range may be a representative amplitude value selected for the frequency range. For example, the representative amplitude value for an audio frequency range may be a greatest amplitude value of the audio frequency range, an average (mean or median) amplitude value of the audio frequency range, or a least amplitude value of the audio frequency range. In one embodiment, the representative value sampled from the audio-frequency range is the mean amplitude value of the audio frequency range at the time the sample is taken.

The sampling intervals may be at different rates for video pixels and audio frequency ranges. For example, video pixels may be sampled at an interval such as the frame rate of the video signal. And, for example, audio frequency ranges may be sampled at rates of up to approximately twice the frequency of the highest frequency sound included in the audio signal. To cause the video and audio time series signals to be sampled at uniform rate, the audio and video time series signals may be resampled as discussed below under the heading "Resampling Time Series at a Uniform Rate." In one example, the resampling increases or decreases the effective sampling rate by including interpolated values in the time series signal. To cause the re-sampled audio and video time series signals to have synchronous observations, the re-sampled audio and video time series signals may be synchronized as discussed below under the heading "Synchronizing Time Series Signals." Thus, in one embodiment, the set of time series signals may be stored as a time series database in which the set of time series signals share an index in common, ether due to sampling at a uniform and synchronous interval for the index, or due to resampling and/or synchronization to arrive at the uniform and synchronous interval for the index. In one embodiment, resampling and synchronizing of the time series signals may be performed by re-sampler and synchronizer 160.

In one embodiment, the audio-visual content is a sound and moving image recording of a human speaker or a person delivering a speech. For example, a person delivering a speech or human speaker is a being that is talking or vocalizing words. The visual content shows the movement of the speaker while the speaker is delivering the speech. The movement of the speaker may include mouth, eye, or other facial movements, head and body movements including gestures with head, limbs, hands or digits. The human speaker and the motions of the speaker are represented in one or more of the pixels of the video signal. The audio content includes the sound of vocalizations by the speaker of the words in the speech. The speech delivered by the human speaker is represented in one or more of the frequency ranges of the audio signal.

The audio-visual content is carried by an audio-video signal including a video signal and concurrent audio signal that is integrated with the video signal. The audio-video signal may be transmitted by broadcast for concurrent reception by multiple devices, or transmitted by one or more individual non-concurrent streams to one or more devices. The audio-video signal may be encoded for transmission, and decoded prior to sampling.

The video signal is data that describes the visual portion of the audio-visual content. The video signal describes intensity values for pixels of a frame of the visual content over time. As mentioned above, these intensity values (such as intensity values for each of red, green, and blue channels) of a pixel may be sampled from the video signal. The video signal can be parsed to identify the intensity values for the various pixels, and the intensity values of the pixels can be sampled and placed into time series signals corresponding to the pixels. Time series signals sampled from the video signal may be referred to herein as video time series signals. Following sampling, the human speaker and the motions of the speaker are represented in the video time series signals.

The audio signal is data that describes the audible portion of the audio-visual content. The audio signal describes a sound waveform of the audio content over time. As mentioned above, amplitude values of various frequency ranges of the sound waveform may be sampled from the audio signal. The sound waveform can be decomposed into the amplitudes of the frequency ranges, and the amplitude values for the frequency ranges can be sampled and place into time series signals corresponding to the frequency ranges. Time series signals sampled from the audio signal may be referred to herein as audio time series signals. Following sampling, the speech delivered by the human speaker is represented in the audio time series signals.

The set of time series signals includes time series data structures containing values sampled from the discrete portions of the audio-visual content: pixels and audio frequency ranges. There is a time series signal in the set for each discrete portion of the audio-visual content that is sampled.

The video time series signals are a subset of the set of time series signals that were sampled from video portions (such as pixels) of the audio-visual content, such as set of video time series signals VTSS as discussed below. For example, a video time series signal includes a series of intensity values for one or more color channels of one pixel. In another example, the video time series signal includes a series of intensity values from more than one adjacent pixels. The intensity values recorded in the video time series signal are indexed in the order in which the samples were taken from the pixel. The video time series signals may be collectively referred to herein as the video subset of the time series signals.

In another example, the discrete portions of the video content are not individual pixels, but blocks of multiple adjacent pixels in the video frame. The block of multiple adjacent pixels is sampled, and a representative intensity value (per color channel) for the block is selected for inclusion in the video time series signal. For example, the representative intensity value (for a given color channel) for a block may be a greatest intensity value of the block, an average (mean or median) intensity value of the block, or a least intensity value of the block. In this embodiment, the video time series signal includes a series of representative intensity values from blocks of more than one adjacent pixels.

The audio time series signals are a subset of the set of time series signals that were sampled from audio portions (such as audio frequency ranges) of the audio-visual content, such as set of audio time series signals ATSS as discussed below. For example, an audio time series signal includes a series of amplitude values for one audio frequency range (or bin) of an audio spectrum. The amplitude values recorded in the audio time series signal are indexed in the order in which the samples were taken from the frequency range. The audio time series signals may be collectively referred to herein as the audio subset of the time series signals.

Thus, in one embodiment, deepfake detection method 200 converts audio-visual content into time series signals by repeatedly sampling values from pixels of the video and frequency ranges of the audio, and writing the sampled values into time series signals that correspond to the pixels and frequency ranges. The time series signals are sampled (or resampled, as discussed below) to have a uniform sampling rate or interval of observations across the set of time series signals and are synchronous (or have been synchronized, as discussed below) to have concurrent observations occur at corresponding time stamps. Process block 210 then completes, and deepfake detection method 200 continues at process block 215. Additional detail on conversion of the audio-video content into time series signals is provided herein below, for example under the heading "Conversion to Time Series Signals."

At the completion of process block 210, deepfake detection method 200 has created a set of time series signals that represents the audio-visual content, such as synchronous, uniformly sampled database of time series signals TSS as discussed below. The set of time series signals has been made ready for processing with a machine learning model to generate a set of residual time series signals in process block 215.

At process block 215, deepfake detection method 200 generates residual time series signals of residuals that indicate an extent to which the time series signals differ from machine learning estimates of authentic delivery of the speech by the person. For example, deepfake detection method 200 generates a set of residual time series signals from the set of time series signals and a set of estimates for the time series signals made by a machine learning model, wherein the machine learning model generates the estimates to be consistent with authentic speech by the human speaker. In one embodiment, the functions of process block 215 are performed by residual signal generator 110.

As discussed above, a residual value is a difference between a value and a machine learning estimate or prediction of what the value is expected to be. A residual time series signal is a time series of residual values. A residual time series signal for a variable may be generated by calculating the difference between values in a time series signal for the variable and machine learning estimates for the values.

The machine learning estimates for the values are estimates of authentic delivery of the speech by the person that is the subject of the audio-visual content. As used herein with reference to a person speaking or a human speaker delivering a speech, the term "authentic" refers to audio-visual content (and time series signals derived therefrom) in which the words spoken by the speaker are not faked or altered, and in which the motions of the person while speaking are not faked or altered. In other words, the machine learning estimates for the values are estimates or predictions of what the values should or ought to be, provided that the time series signals represent audio-visual content in which words spoken by the person and motions (especially mouth motions) of the person are not faked or altered and are instead genuine and unmodified.

The machine learning model has been trained (as discussed in further detail below) to generate the estimates to be consistent with the authentic speech by the person speaking (human speaker). The machine learning model is a multivariate pattern recognition model that accepts values for multiple variables as inputs and generates an estimate value for each variable based on the input values of the other correlated variables. The time series signals—including both the video and audio subsets—are assigned as inputs for variables of the machine learning model. For example, the values of a first time series signal in the set of time series signals are provided as a sequence of values for a first variable of the multivariate machine learning model, the values of a second time series signal in the set of time series signals are provided as a sequence of values for a second variable of the multivariate machine learning model, and so on. Because the set of time series signals includes both the audio and video subsets of the time series signals, the inputs to the machine learning model therefore include audio time series signals representing the audible words spoken by the person in the audio-visual content and video time series signals representing the appearance and motions of the person while speaking the audible words in the audio-visual content.

The machine learning model generates estimates for the values one observation at a time. For example, the machine learning model accepts one value for each variable from each input signal and generates an estimated value for each variable based on the values input for the other variables. The values input to variables are correlated with one another by sharing an index position (such as observation number or time stamp) within their respective time series signal. A set of residual time series signals corresponding to the set of time series signals may be generated from the values of the set of time series signals and machine learning estimates of those values. Because the machine learning estimate for a value approximates what the value ought to be provided that the value is derived from authentic audio-visual content that accurately represents the human speaker, the residual between the value and the estimate for the value indicates an amount by which the value diverges from ML-estimated authentic speech by the human speaker. Thus, the residual time series signal produced for a variable is an observation-by-observation indication of the extent to which a value in the time series signal differs from estimated values that represent authentic delivery of the speech by the person. The set of residual time series signals generated from the set of time series signals sampled from the audio-visual content indicates how far the set of time series signals is deviating from what the time series signals should be if the audio-visual content is authentic.

Residual values for each variable are generated from the input value for the variable and the machine learning estimated value for the variable. Thus, residual values for a variable are determined from the sampled (or re-sampled) values in the time series signals for the variable and the machine learning estimates for those values. The machine learning model repeats the estimation and generation of a residual for the number of observations or length of the time series signal, thus producing a series of residuals for each variable. The residuals for a variable may be stored in a time series data structure, creating a residual time series signal for the variable. The residuals for a variable are stored in the residual time series signal for the variable in the same order as the values from which the residuals are generated appear in the time series signals.

Thus, in one embodiment, deepfake detection method 200 generates residual time series signals of residual values that indicate an extent to which the time series signals differ from machine learning estimates of authentic delivery of the speech by the person by, for each time series value in the set of time series signals, generating an estimated value of what the value ought to be if the audio-visual content is authentic, calculating the residual between the value and the estimate, and storing the residual value in a set of residual time series signals.

Process block 215 then completes, and deepfake detection method 200 continues at process block 220. Additional detail on generation of residual time series signals is provided herein below, for example under the heading "ML Production of Residuals."

At the completion of process block 215, a set of residual time series signals has been generated that show how different the audio-visual content is from what would be expected if the audio-visual content is expected. Each residual time series signal indicates the extent of the difference between actual and expected authentic value, as it changes over time, for a particular portion (e.g., pixel or frequency range) of the audio-visual content. The residual values may be analyzed to determine whether the corresponding portions of the audio-visual content include deep-faked modifications that are inconsistent with authentic content.

At process block 220, deepfake detection method 200 placing residual values from one synchronous observation of the residual time series signals into an array of residual values for a point in time. For example, deepfake detection method 200 places residual values from one synchronous observation of the set of residual time series signals into a two-dimensional array that is divided into a video partition and an audio partition. Residual values generated for the video subset are placed within the video partition, and residual values generated for the audio subset are placed in the audio partition. In one embodiment, the functions of process block 220 are performed by array generator 115.

An array is a data structure in which data values may be stored in cells that are addressable by an index. Each cell in the array corresponds to or is assigned to a particular portion (pixel or pixel color channel, or frequency range) of the audio-visual content. Accordingly, each cell in the array may be populated with a residual value from the residual time series signal for the particular portion of the audio-visual content. The cells in the array are divided into two discrete partitions of contiguous cells: an audio partition and a video partition. Cells that correspond to pixels (or color channels of pixels) are included in the video partition (and not included in the audio partition). Cells that correspond to frequency ranges (bins) are included in the audio partition (and not included in the video partition).

The array is populated with residual values for a single particular point in time. These are residual values for one synchronous observation of the set of residual time series signals. An observation is "synchronous" where the values of the observation share a time stamp in common. The residual values for the point in time or synchronous observation share an index position in common within their respective residual time series signals. The residual value for the particular point in time, observation, or index position is selected from each of the residual time series signals in the set, and placed into the array in the cell that corresponds to the particular portion of the audio-visual content represented by the residual time series signal. Because the array includes values for one particular point in time, observation, or index position across the set of residual time series signals, the array may be referred to herein as a "static" array. Once populated, the array indicates the extent to which each particular portion of the audio-visual content deviates from values consistent with authentic speech at the particular point in time.

As used herein, "placing" a value into the array refers to storing the value in a cell of the array, for example by writing the value in the memory location for the cell. The array is populated by placing values into the cells of the array. In one embodiment, the array is divided into two partitions: a video partition and an audio partition. A partition of the array is a discrete region or range of cells that does not overlap with another partition. A partition may be defined by a selected range of index values for cells of the array. Cells of the array with an index value within the selected range are within the partition. In one embodiment, where the array is a two-dimensional array, the two-dimensional array is divided along a larger of the two dimensions into the video partition and the audio partition. In this configuration, the video partition extends over one discrete range of the larger dimension, and the audio partition extends over another discrete range of the larger dimension.

The video partition is a region or range of cells in the array reserved for values that represent pixels (or color channels of pixels) of the video content. When populating the array (that is, when placing or storing values in the array), values that represent pixels (or color channels of pixels) are placed into cells of the video partition, and are not placed into cells of the audio partition. Residual values generated for the video subset of the time series signals are therefore placed within the video partition. The audio partition is a region or range of cells in the array reserved for values that represent audio frequency ranges of the audio content. When populating the array, values that represent frequency ranges (that is, "bins") are placed into cells of the audio partition, and are not placed into cells of the video partition. Residual values generated for the audio subset of the time series signals are therefore placed within the audio partition. As used herein, values (or time series signals of values) "represent" a particular portion (pixel or color channel of pixel, or frequency range) of the audio-visual content where they are a value sampled from the particular portion, an ML-estimated value for the particular portion, or a residual value generated for the particular portion.

In one embodiment, the array may be a two-dimensional array, a data structure for storing data values in a matrix or grid of cells. Index values for cells within the two-dimensional array are a tuple of two values: a position along a first dimension of the array and a position along a second dimension of the array. A two-dimensional array may also be referred to herein as a "rectangular" array.

As discussed below, spatial correspondence between pixel location in the video frame and cell location in the video partition enhances explain-ability of alerts because a corresponding pixel location within the frame is readily identifiable from the location of a cell where deviation from authentic speech is detected. In one embodiment, the two-dimensional array has dimensions that accommodate the spatial layout of a pixel grid for a frame of the video content. The video partition of the two-dimensional array has dimensions that allow the values representing the pixels (or color channels of the pixels) to be placed in cells that correspond to the location of the pixels in the frame.

For example, the smaller dimension of the array has a size that encompasses or includes a smaller dimension of the pixel grid. Here, the smaller dimension of the array may have as its size in cells the number of pixels along the smaller dimension of the pixel grid for a frame of the video content. Also, for example the larger dimension of the array has a size that encompasses or includes both an audio partition and a larger dimension of the pixel grid multiplied by a number of color channels per pixel. For example, the larger dimension of the array may have as its size in cells the number of pixels along the larger dimension of the pixel grid for the frame multiplied by the number of color channels per pixel, in addition to cells for an audio partition.

More generally, a frame of the video content may have a pixel grid of M pixels in a first dimension by N pixels in a second dimension. A pixel has K color channels, for example where pixels have red, green, and blue channels, K=3. In one embodiment, the K values representing color channels of a pixel are placed in a sequence of K cells in the video partition of the array. The sequence of K cells in the video partition corresponds to the location of the pixel in the pixel grid of the frame.

In one example configuration of the two-dimensional array, the dimensions of the video partition are (at least) K×M by N cells. The K values representing color channels of a pixel are placed in a sequence of K cells in the first dimension, for example horizontally in a row along the x axis of the two-dimensional array. The corresponding location of a pixel $P_{m,n}$ in the video frame for a cell $C_{x,y}$ at coordinates (x,y) in the video partition of the two-dimensional array is (m, n). In this example configuration, pixel coordinate m is the integer quotient of array coordinate x divided by number of color channels K (m=x/K, using Euclidean or remainder division to produce the integer quotient and discarding the remainder), and where pixel coordinate n is equal to array coordinate y (n=y). Also, in this example, the corresponding location of the sequence or row of cells $C_{x1,y}, \ldots, C_{xK,y}$ for the K color channels in the video partition for a pixel $P_{m,n}$ in the video frame are $(x_1,y), \ldots, (x_K,y)$, where $x_1$=K×M−(K−1), ..., $x_K$=K×M−(K−K). An example use of this configuration where K=3 color channels is 3M×N video partition 305, as shown and described below with reference to FIG. 3.

In one example configuration of the two-dimensional array, the dimensions of the video partition are M by K×N cells. The K values representing color channels of a pixel are placed in a sequence of K cells in the second dimension, for example vertically in a column along the y axis of the two-dimensional array. As above, pixel $P_{m,n}$ in the video frame and cell $C_{x,y}$ in the video partition are corresponding locations. In this example configuration, for corresponding pixel $P_{m,n}$ and cell $C_{x,y}$, pixel coordinate m is equal to array coordinate x (m=x), and pixel coordinate n is the integer quotient of array coordinate y divided by number of color channels K (n=y/K, using Euclidean or remainder division). Also, in this example configuration, the corresponding location of the sequence or column of cells $C_{x,y1}, \ldots C_{x,yK}$ for the K color channels in the video partition for a pixel $P_{m,n}$ in the video frame are $(x,y_1), \ldots (x,y_K)$, where $y_1$=K×N−(K−1), ..., $y_K$=K×N−(K−K).

The audio partition of the two-dimensional array may be placed adjacent to the video partition along one edge of the video partition. The audio partition therefore has a one dimension equal to the dimension of the dimension of the video partition along the edge where it is adjacent to the video partition. In one embodiment, the audio partition may be a one-dimensional row or column placed along the edge of the array. In one embodiment, the audio partition is two-dimensional and has another dimension extending away from the edge where it is adjacent to the video partition. In one embodiment, the dimensions of the audio partition are equal, and the audio partition is a square region of cells with dimensions equal to the dimension of the video partition along the edge where the audio and video partitions are adjacent. In one embodiment, the audio content is subdivided into as many audio frequency ranges as there are cells in the audio partition. Therefore, the number of audio frequency ranges is chosen based on the number of cells in the audio partition.

In one embodiment, the audio partition is positioned along the edge highest in the x dimension (or "right edge") of the video partition, and has one dimension that is the length of the y dimension of the video partition, for example as does N×N audio partition 310 shown and described below with reference to FIG. 3. Other alternative placements of the audio partition within the two-dimensional array are contemplated by the invention. In another embodiment, the audio partition is positioned along the edge least in the x dimension (or "left edge") of the video partition and has one dimension that is the length of the y axis of the video partition. In another embodiment, the audio partition is positioned along the edge least in the y dimension (or "upper edge") of the video partition and has one dimension that is the length of the x dimension of the video partition. In another embodiment, the audio partition is positioned along the edge highest in the y dimension (or "lower edge") of the video partition and has one dimension that is the length of the x dimension of the video partition. Where the audio partition is placed on the left edge, cell coordinates in the two-dimensional array (as discussed above) are adjusted by adding the length of the audio partition in the x dimension to the x coordinate of the cell. Where the audio partition is placed on the upper edge, cell coordinates in the two-dimensional array are adjusted by adding the length of the audio partition in the y dimension to the y coordinate of the cell.

Values representing the audio frequency ranges are placed in cells of the audio partition. In one embodiment, the values are placed in the audio partition in ascending or descending sequence of the range. For example, the value representing a lowest audio frequency range is placed in a first cell of the audio partition, the value representing the next lowest range is placed in a second cell of the audio partition, and so on through the value representing the highest audio frequency range of the audio content. In one embodiment, where the audio partition covers more than one row or column in the two-dimensional array, the sequence of values representing the ranges may wrap across the rows and columns. For example, the values may: wrap from left-to-right (low x dimension to high x dimension), top-to-bottom (low y dimension to high y dimension); wrap from top-to-bottom (low y to high y), left-to-right (low x to high x); wrap from right-to-left (high x to low x), top-to-bottom (low y to high y); wrap from top-to-bottom (low y to high y), right-to-left (high x to low x); wrap from left-to-right (low x dimension to high x dimension), bottom-to-top (high y to low y); wrap from bottom-to-top (high y to low y), left-to-right (low x to high x); wrap from right-to-left (high x to low x), bottom-to-top (high y to low y); wrap from bottom-to-top (high y to low y), right-to-left (high x to low x); wrap in a spiral inwards or outwards; wrap back and forth; or otherwise be placed into the audio partition in order of the frequency range.

The residual values from one synchronous observation of the set of residual time series signals are placed into the array. The synchronous observation of residual values are residual values for an individual point in time. One synchronous observation of the set of residual time series signals is the set of residual values that appear at a particular index value in the residual time series signals in the set of residual time series signals. Just as the set of time series signals share an index in common across the signals in the set, the set of residual time series signals share the index in common across the residual signals in the set. The particular index value indicates the residual values in the set of residual time series signals that occur at the point in time.

One residual value at the index value is read or extracted from each of the residual time series signals. The extracted residual value is placed into the array. The cell location where the extracted residual is placed is a cell location that corresponds to the portion of the audio-visual content represented by the respective residual time series signal from which the value is extracted. The synchronous observation of residual values is therefore a one-value-thick "slice" across the set of residual time series signals occurring at the point in time indicated by the index. The synchronous observation of residual values is the collection of residual values that occur at one moment in time. The array may be referred to herein as a "static" array because the array contains values that are all for the one particular point in time, rather than being for multiple points in time.

Thus, in one embodiment, deepfake detection method 200 places residual values from one synchronous observation of the residual time series signals into an array of residual values for a point in time by reading a value at a particular index value for a particular point in time from each of the residual time series signals; and writing the value into the array in a cell that corresponds to the particular portion of the audio-visual signal represented by the residual time series signal. Process block 220 then completes, and deepfake detection method 200 continues at process block 225. Additional detail regarding the structure of an array and placement of residual values into the array is provided herein below, for example under the heading "Residuals Array Structure for Deepfake Detection."

At the completion of process block 220, an array of residuals has been created that shows the magnitude of difference between recorded values and ML-estimates of authentic values at one moment in time for all individual portions of the audio-visual content. This array of residuals may be analyzed sequentially to detect excessive deviations from authentic values in the audio-visual content. In one embodiment where the array is two-dimensional, the rows and columns of the array may be analyzed by concurrent parallel analyses.

At process block 225, deepfake detection method 200 performs a sequential analysis of the residual values of the array to detect an anomaly in the residual values for the point in time. For example, deepfake detection method 200 performs a sequential analysis of the residual values across two dimensions of the two-dimensional array to detect an anomaly in the residual values. In other words, a series of residual values in the array are checked for values that deviate significantly from other residual values in the series. Residual values that deviate significantly from the others indicate portions of the audio-visual signal where the difference between actual values and estimated authentic values is anomalously large. Portions of the audio-visual signal where such anomalies occur are likely to have been modified to misrepresent the movement of the person speaking and/or the words of spoken by the person. In one embodiment, the functions of process block 225 are performed by sequential analyzer 120.

Where the array is a one-dimensional array, sequential analysis is performed for the series of residual values that have been placed in the array. Where the array is a two-dimensional array, the method 200 operates to perform a sequential analysis of the residual values across two dimensions of the two-dimensional array. A sequential analysis is performed for series of residual values in the rows and/or columns. Consider an example two-dimensional array with dimensions of K×M+N by N cells. This example two-dimensional array has a video partition that is K×M by N cells and an audio partition adjacent to the right edge of the video partition that is N×N cells (similar to the configuration of static array 300 as shown and described below with reference to FIG. 3). In this example two-dimensional array, the K×M+N cell (horizontal) dimension of the array is a larger dimension of the array, and the N cell (vertical) dimension of the array is a smaller dimension of the array.

In one embodiment, sequential analysis of the residual values is performed across two dimensions of the two-dimensional array. Performing the sequential analysis across more than one row of the two-dimensional array, more than one column of the two-dimensional array, or both more than one row and more than one column of the two-dimensional array are examples of performing sequential analysis across two dimensions of the array. In one embodiment, sequential analysis is performed for each of the N rows in the two-dimensional array. In one embodiment, sequential analysis is performed for each of the K×M+N columns in the two-dimensional array. In one embodiment, sequential analysis is performed for each of the rows and columns of the two-dimensional array. The sequential analyses for individual rows and individual columns of the array may be performed in parallel with each other.

In one embodiment, the sequential analysis of the residual values of the array may be performed using the sequential probability ratio test (SPRT), as discussed below in further detail. Sequential analyses such as SPRT may be used to detect an anomaly—that is, a value that deviates from other values in a way that satisfies a threshold calculation—in a sequence of values. Such anomalous deviation in the sequence of may be defined by a pre-established threshold calculation. In SPRT, for example, a value in the sequence that satisfies a user-selected threshold value of cumulative sum of log likelihood ratios over the sequence of values is anomalous, as discussed in further detail below. A user or administrator may configure the threshold value to set a sensitivity level for detection of anomalies. In one embodiment, the sensitivity level is set relatively high so as to detect as anomalous those residual values that are almost certainly due to manipulation of the audio-video content, with relatively lower false alerts. In one embodiment, the sensitivity level is set lower so as to detect residual values as anomalous that may be due to more subtle manipulation of the audio-video content, with relatively higher false alerts.

The sequential analysis of the residual values of the array are used to detect an anomaly in the residual values for a particular point in time. Because the residual values in the array are all from one particular point in time (or observation) across the respective residual time series signals, the sequential analysis examines a sequence(s) of residual values from multiple discrete time series signals for the one particular point in time for anomalies, rather than examining a sequence of residual values over multiple points in time within one time series signal for anomalies. Thus, residual values representing the same moment for multiple portions of the audio-visual content are analyzed to detect if the residual for any portion is anomalous with respect to other residuals at the point in time. It is possible that the sequential analysis of the residual values may detect multiple anomalies in a sequence of residual values.

A residual value representing a portion of the audio-visual content at a point time that is anomalous with respect to the residual values for other portions at the point in time indicates that the portion has been altered away from what would be authentic at the point in time. A large residual value for a particular portion of the audio-visual content at a particular time is indicative of the presence of inauthentic content at that portion and time. Sequential analysis of residuals representing multiple portions of the audio-visual content for the same point in time thus detects or identifies portions of content that are altered or manipulated.

Identifiers for the manipulated portions of content may be recorded. Upon detection of anomalous residual values, identifiers for the portion(s) of the audio-visual content that have anomalous residuals may be stored or recorded for subsequent processing. Such identifiers may include array index locations for cells in which the anomalous residuals were detected, and/or the pixel location(s) or audio frequency range(s) for the portion(s) that correspond to the cells that contain anomalous residuals. The corresponding portions of the audio-visual content may then derived from the index locations for the cells that contain anomalous residuals as discussed above.

In one embodiment, deepfake detection method 200 performs a sequential analysis of the residual values of the array to detect an anomaly in the residual values for the point in time by accessing or retrieving a sequence of residual values for the one point in time from the array, analyzing the sequence of residual values with SPRT, and detecting that a residual value in the series is anomalous because the residual values deviates from other residual values to an extent that indicates that the portion of content that is represented by the residual value may have been manipulated. In one embodiment, the sequential analysis of the residual values is performed in two dimensions by analyzing sequences of residuals from one or more rows of the array and one or more columns of the array with SPRT and detecting an anomalous residual value in any one or more of the columns or rows. Process block 225 then completes, and deepfake detection method 200 continues at process block 230. Additional detail regarding the sequential analysis of the array of residual values for anomaly detection is provided herein below, for example under the heading "Static Array Residual Analysis."

At the completion of process block 225, anomalous residual values have been detected in the array of values from residual time series signals at one point in time or observation, provided any such anomalous residual values are present. The presence of an anomalous residual value in a cell of the array indicates that the portion of the audio-visual content represented at that cell has satisfied a threshold that shows the portion of content to have been modified.

At process block 230, in response to detection of the anomaly, deepfake detection method 200 generates an alert that deepfake content is detected in the audio-visual content. For example, in response to detection of the anomaly, deepfake detection method 200 generates an alert that deepfake content that misrepresents the human speaker or the speech is detected in the audio-visual content. In one embodiment, the functions of process block 230 are performed by alert generator 125.

In one embodiment, deepfake content refers to modification of the audio-visual content or example when fake words are injected and/or when mouth or other face movements are altered to be consistent with speaking the fake words. Fake words may be injected into the content of the speech carried by the audio-visual signal by replacing the words as spoken by the speaker with audio of other words. The injected words are fake—not actually spoken by the recorded human speaker—but may have been spoken with a very similar voice. In one embodiment, the deepfake content that is detected includes altered mouth movements on the human speaker to accompany fake words. The likeness—that is, the face or visage—of the human speaker is maintained in the deepfake content that is detected in order to misrepresent to a viewer of the audio-visual content that the injected words were spoken by the speaker. This deepfake content misrepresents the human speaker or the speech of the human speaker by altering or modifying the audio-visual content away from an accurate representation of what the human speaker actually said, and presenting the altered content as if it were unaltered. Thus, in one embodiment, the method detects fake words apparently spoken by the human speaker that is the subject of the audio-visual content. The falsified spoken words added to the speech may then be pointed out to viewers or hearers of the audio-visual content.

To determine whether to generate an alert for a point in time, the deepfake detection method 200 determines whether or not an anomaly was detected in the array of residuals for the point in time. Injection of fake words, alteration of mouth movements, or other modifications that misrepresent the speech appear as anomalies in the sequential analyses (described above in process block 225) for the observation or point in time. Deepfake manipulation of the audio-visual content may be inferred from the presence of the anomalous residual because the portion of the content represented by the anomaly is too inconsistent with authentic speech when compared with other portions not to have been modified in a way that the other portions were not.

In one embodiment, generation of the alert is performed in response to detection of the anomaly in the residuals by causing the alert to be generated at least in part, directly or indirectly, because the anomaly is detected. Therefore, when an observation includes an anomaly, the presence of deepfake content is inferred from the anomaly, and an alert is automatically generated. When an observation does not include an anomaly, the absence of deepfake content is inferred from the lack of anomalies, and no alert is generated.

In one embodiment, generation of the alert may be based on detection of a single anomaly in the residual array for a point in time. In one embodiment, generation of the alert may be based on detection of an alerting threshold number or proportion of anomalies in the residual array for a point in time. For example, the alert may be based on an alerting threshold of number or proportion of cells in the residual array that hold anomalous residuals, such as triggering an alert where anomalies are detected in 1% or more of the cells of the residual array for the point in time. Thus, generation of an alert may be based on detecting (at process block 225) a quantity of anomalous residuals greater than an alerting threshold number or alerting threshold proportion of the residuals. Therefore, in one embodiment, where the number of anomalous residuals detected for a point in time are greater than the alerting threshold, the presence of deepfake content is inferred, and an alert is automatically generated. When the number of anomalous residuals detected does not exceed the alerting threshold, no alert will be generated. Generation of an alert in response to a single detection of an anomalous residual in the array for the point in time may be considered an alerting threshold of one.

In one embodiment, the alert is an electronic message. In one embodiment, deepfake detection method 200 composes an electronic message which indicates or communicates that there is deepfake content in the audio-visual content. The alert may include a description of the portion(s) of the audio-visual content (such as pixel locations and audio frequency ranges) where the deepfake content occurs and a time at which the deepfake content occurs. Identifiers for the manipulated portions of content (recorded as described in process block 225 above) are retrieved from storage and written into the alert to indicate pixel locations and audio frequency ranges of the deepfake content. In one embodiment, the alert includes one or more pixel locations or coordinates at which there is deepfake content present in an observation of the visual content. In one embodiment, the alert includes one or more audio-frequency ranges at which there is deepfake content present for a period of time of the audio content. In one embodiment, the alert includes a time (such as a time stamp, a range of time, an observation, or a frame) at which the detected deepfake content is present in the audio-visual content.

The alert may be generated, then transmitted for subsequent presentation on a display or other action. The alert may be configured to be presented by display in a graphical user interface. The alert may be configured as a request (such as a REST request) used to trigger initiation of some other function. The alert may be presented by extracting the content of the alert by a REST API.

In one embodiment, the alert may be transmitted to a GUI audio-visual player for concurrent display with the audio-visual content. The audio-visual player may be a multimedia player embedded in a web browser, or a discrete software application. In one embodiment, the audio-visual player is configured to display the alert message along with the audio-visual content. In one embodiment, the GUI is configured to display the alert message (or a human-readable interpretation of the alert message) along with the audio-visual content. In one embodiment, the GUI is configured to parse the pixel locations from the alert message and highlight them in the visual content by altering their color, outlining them with a colored border, or otherwise indicating where the pixels are deepfake content. In one embodiment, the GUI is configured to add a visual alert message to the visual content indicating that deepfake content is present in the audio-visual content. In this way, the deepfake content may be visually indicated to a viewer of the audio-visual content.

In one embodiment, the generation and transmission of the alert may be performed in a real time (or near real time) so as to present the alerts at a time that deepfake content occurs in a live transmission (e.g., broadcast or stream) of the audio-visual content. In one embodiment, as used herein "real time" refers to substantially immediate operation, with generation and availability of the alert subject only to a minimal delay acceptable in the context of live audio-visual transmissions. In this way, the alert that deepfake content is present in the audio-visual content may be presented contemporaneously with the display of the deepfake in the audio-visual content. The alert may be used to direct the attention of a viewer of the audio-visual content to the fact that deepfake content is being used to misrepresent what the person speaking is saying.

Thus, in one embodiment, deepfake detection method 200 generates an alert that deepfake content is detected in the audio-visual content by determining that an alerting threshold amount of anomalous residuals were detected in the array; composing an alert that indicates that deepfake content that misrepresents the speech or speaker is present in the audio-visual content; and transmitting the alert for presentation with the audio-visual content. Process block 230 then completes.

At the completion of process block 230, an electronic alert message that indicates deepfake content included a synchronous observation (for a particular point in time) of the audio-visual content has been generated. In one embodiment, those portions of the observation where the audio-visual content has been modified are pointed out as deepfake content in the alert. In one embodiment, the alert describes audio frequency ranges of the audio-visual content where the sounds of fake words are injected and/or pixel locations where mouth, face, or other movements of a speaker fake words were injected or when mouth or other face movements were altered to be consistent with speaking the fake words. The alert may be used to warn a viewer of the audio-visual content about the deepfake misrepresentation of the content of the speech.

In one embodiment, process blocks 220-230 may repeat in a loop for a sequence of observations of the residual time series signals. Where there is a subsequent observation (representing a next point in time or frame) in the residual tune series signals, processing returns to process block 220, and repeats for the subsequent observation. Where there are no further observations in the residual time series signals, deepfake detection method 200 continues to END block 235 and completes.

At the completion of deepfake detection method 200, a series of deepfake alerts is provided as a companion signal to an audio-visual signal carrying the audio-visual content. The deepfake alerts correspond with the audio-visual content on the basis of time (for example, by time stamp) so that the deepfake alerts describe times at which they are applicable to the audio-visual content. In one embodiment, the deepfake alerts may be provided contemporaneously, in real time, with the audio-visual content that the alerts correspond to. This enables the attention of a viewer to be directed to the presence of deepfake misrepresentation in a live audio-visual transmission at the time the misrepresentation occurs, even where the deepfake misrepresentation is otherwise imperceptible to the human viewer.

As discussed above, the audio-visual content may be converted into time series signals, including audio time series signals representing audio-frequency ranges or bins, and video time series signals representing intensity values for color channels of pixels. In one embodiment of process block 210, deepfake detection method 200 converts the audio-visual signal into the video subset of time series signals by sampling time series signals from pixels of a frame of video in the audio-visual signal. And, deepfake detection method 200 converts the audio-visual signal into the audio subset of time series signals by sampling time series signals from frequency ranges of the audio signal. In another embodiment of process block 210, deepfake detection method 200 samples pixels of video in the audio-visual content to create a video subset of the time series signals that represent the video of the person. And, deepfake detection method 200 samples frequency ranges of the audio in the audio-visual content to create an audio subset of the time series signals that represents the audio of the speech. Residual values generated from the video subset are placed into a video partition of the array, and residual values generated from the audio subset are placed into an audio partition of the array.

As discussed above, sequential analysis for anomalies in the array may be performed for sequences of residual values that include residuals generated from video intensity values and corresponding estimates and residuals generated from audio amplitude values and corresponding estimates. In one embodiment of process block 225, therefore, deepfake detection method 200 performs the sequential analysis along one or more rows in a larger dimension of the two-dimensional array. Here, an individual row in the larger dimension of the two-dimensional array includes cells in both the video partition and the audio partition of the rectangular array.

As discussed above with reference to process block 220, the array may be two-dimensional, and include a video partition with dimensions to accommodate a frame of the video content, as well as an adjacent audio partition along one edge of the video partition. In one embodiment, following process block 215, deepfake detection method 200 generates the two-dimensional array. The two-dimensional array is generated to have a video partition. The video partition has a first dimension of the video partition that is a first size of a first dimension of a pixel grid for a frame of video in the audio-visual signal. The video partition has a second dimension of the video partition that is a second size of a second dimension of the pixel grid multiplied by a number of color channels per pixel. In one embodiment of process block 220, the residual values generated for the video subset are placed into the video partition in cells corresponding to a location of the pixel within the pixel grid.

As discussed herein, the rows and columns of the two-dimensional array enable parallelism in performing sequential analysis of residual values. In one embodiment of process block 225, deepfake detection method 200 causes parallel processors to simultaneously perform sequential probability ratio tests across rows of the two-dimensional array and columns of the two-dimensional array. The anomaly is detected when any one of the sequential probability ratio tests across rows or columns identifies an anomalous residual. In one embodiment, sequential probability ration tests are performed across rows of the two-dimensional array and columns of the two-dimensional array simultaneously by parallel processors. The parallel processors may be, for example, multiple CPUs or GPUs.

As mentioned above in the discussion of converting audio-visual content into time series signals in process block 210, sampling intervals across the set of signals might not necessarily be uniform or synchronized. Thus, in one embodiment of process block 210, deepfake detection method 200 resamples one or more of the time series signals to cause the set of time series signals to be sampled at a uniform rate (as discussed below under the heading "Resampling Time Series at a Uniform Rate"). And, deepfake detection method 200 phase shifts the time series signals to cause the observations of the signals to be synchronized (as discussed below under the heading "Synchronizing Time Series Signals").

In one embodiment, prior to generating residual time series signals as discussed at process block 215, the machine learning model is trained to generate estimates that are consistent with authentic speech by the person speaking in the audio-visual content. In one embodiment, the audio-visual content itself may be used as a reference of authentic speech, for example by designating a portion of the speech that is highly likely to be authentic and unmodified by deepfake content, such as introductory remarks or greetings, to be a reference. In one embodiment, during streaming of the audio-visual signal, deepfake detection method 200 designates a reference segment of the set of time series signals to be representative of authentic speech by the human speaker. For example, reference data set 172 may be a segment of time series signals 135 derived from audio-visual content 130. Before generating the set of residual time series signals, deepfake detection method 200 trains a machine learning model to generate estimates of the time series signals that are consistent with the authentic speech based on the reference segment of the set of time series signals.

In one embodiment, other audio-visual content of other speech by the same human speaker may be used as a reference set of time series signals for authentic speech. In one embodiment, the other audio-visual content has been confirmed to be authentic audio and video of speech by the human speaker. In one embodiment, deepfake detection method 200 retrieves a reference set of time series signals that are representative of authentic speech by the human speaker in a reference audio-visual content. For example, reference data set 172 may be time series signals derived from a reference audio-video recording of the speaker speaking on a different occasion from that shown in audio-visual content 130. Before generating the residual time series signals, deepfake detection method 200 trains a machine learning model to generate the machine learning estimates of authentic delivery of the speech based on the reference set of time series signals. Additional detail on training the machine learning model is discussed below under the heading "ML Production of Residuals."

In one embodiment of process block 230, deepfake detection method 200 includes in the alert one of a location of a pixel in which the anomaly occurred or a frequency range in which the anomaly occurred. And, deepfake detection method 200 also includes in the alert a timestamp at which the anomaly occurred.

In another embodiment of process block 230, deepfake detection method 200 includes in the alert locations of pixels in which the anomaly occurred and a time at which the anomaly occurred. And, with that information, deepfake detection method 200 highlights the pixels in which the anomaly occurred in the audio-visual content to visually indicate the deepfake content.

In another embodiment of process block 230, deepfake detection method 200 includes in the alert a frequency range in which the anomaly occurred and an identifier for a frame of the audio-visual content at which the anomaly occurred. And, with that information, deepfake detection method 200 adds a warning to the audio-visual content at the frame at which the anomaly occurred to visually indicate the deepfake content.

In one embodiment, the deepfake detection systems and methods described herein present artificial intelligence or machine learning that can autonomously analyze streaming audio-visual content of a human talking, and detect the possible injection of fake audible words and/or altered mouth movements to accompany the words. In one embodiment, this analysis and detection may be performed in real time, while the audio-visual content is being streamed live.

In one embodiment, the deepfake detection systems and methods described herein employ a novel integrated frequency-domain-to-time-domain framework. The framework systematically decomposes video signals into high-resolution spatiotemporal (that is, relating to both space within a video frame and time position within a video signal) time-series signals, and audio signals into fine-grain frequency bins to create time series signals. The framework then synchronously merges the disparate clusters of time series signals together with a method that assures synchronous uniform sampling intervals. The framework then consumes the time series signals with nonlinear nonparametric pattern recognition in order to detect injection of deepfake segments.

—Conversion to Time Series Signals—

In one embodiment, the deepfake detection systems and methods described herein start with separate techniques to transform streaming mega-pixel video and concurrently-streaming audio signals of a human talking into two large clusters of time-series signals. The techniques produce a video cluster of time series signals for the video signal and an audio cluster for the audio signal.

For the video signal, a spatiotemporal transformation is performed for the fine-grain pixel-granularity video signals by turning each pixel into a 3-tuple timeseries. A video signal may be represented by an array of individual pixels that make up the video signal (for example, a megapixel array). The array of pixels includes a pixel for each position within a frame of the video signal. Each individual pixel in an array of pixels is converted into three time series signals VTSS by tracking the Red/Green/Blue (RGB) 3-tuple of metrics in time. This creates three video time series signals VTSS for each pixel, resulting in a number of time series signals representing the video $N_{VTSS}$ that is three times the number of pixels $N_{Pixels}$ in the array ($N_{VTSS}=3\times N_{Pixels}$).

For the audio signal, a frequency domain to time domain transformation is performed by turning a continuous frequency waveform of the audio signal into a set of time series for discrete frequency ranges of the audio signal. The frequency spectrum of the audio signal may be subdivided into a number $N_{Bins}$ of contiguous ranges, or frequency "bins." For example, the number of bins $N_{Bins}$ may be the square of the number of pixels on the smaller dimension of a video frame (as discussed below). Or for example, the number of bins may be another positive integer multiple of the number of pixels on the smaller dimension of the video frame. Or, in another example, the number of bins may be a positive integer multiple of the number of pixels on the larger dimension of the video frame. The amplitude values for each of the bins may be sampled at an interval to produce a set of audio time series signals ATSS representing the audio signal. This creates a number of time series signals representing the audio $N_{ATSS}$ that is the size of the number of bins ($N_{ATSS}=N_{Bins}$).

—Resampling Time Series at a Uniform Rate—

The two databases of video and audio time series signals resulting from the transformations above may have completely different sampling rates, and are therefore asynchronous. ML pattern recognition cannot analyze time series signals with different sampling intervals. Therefore, the two databases of video and audio time series signals are transformed into a synchronous, uniformly sampled database of time series signals by an analytical resampling process. First, the two databases of video and audio time series signals are re-sampled to generate uniformly sampled video and audio time series signals. Then, the uniformly sampled video and audio time series signals are phase-shifted to synchronize the signals.

To re-sample the two databases of video and audio time series signals a common sampling interval is selected for the synchronous, uniformly sampled database. (As used herein, a "common sampling interval" refers to a sampling interval to be used, in common, for both the video and audio time series signals.) The video and audio time series signals are re-sampled at the common sampling interval using an interpolation algorithm. The interpolation algorithm calculates values at the common sampling interval that fall between existing sample points of the video and audio time series signals. The interpolation algorithm may include liner interpolation or higher-order interpolation. The existing sample rate of a signal may be up-sampled or down-sampled, as appropriate, by the interpolation algorithm. In one embodiment, to the existing sampling rate of a time series signal with a slower sampling rate is up-sampled to match the higher sampling rate time series instead of down-sampling higher sampling rate time series because the down-sampling entails some loss of information. In one embodiment, the common sampling interval is an integer multiple of the frame interval of the video signal, reducing the need for interpolation calculations on the video time series signals. The re-sampling produces uniformly sampled video and audio time series signals from the two databases of video and audio time series signals. In this way, one or more of the time series signals in the two databases are resampled to cause the set of time series signals in the two databases to be sampled at a uniform rate across both the time series signals for pixels of the video signal and time series signals for frequency ranges of the audio signal.

—Synchronizing the Time Series Signals—

To synchronize the uniformly sampled video and audio time series signals, the signals are phase-shifted so as to maximize correlation among the signals. The uniformly sampled video and audio time series signals are synchronized with each other using a synchronization technique such as a correlogram technique, a cross power spectral density technique, or a genetic algorithm technique.

In the correlogram technique, one of the uniformly sampled video and audio time series signals is chosen as a reference signal. All of the other time-series signals are then aligned to this reference signal by computing pairwise cross-correlation coefficients and adjusting the lags for individual signals to optimize the cross-correlation coefficients with respect to the reference signal.

In the cross power spectral density technique, each pair of the uniformly sampled video and audio time series signals is analyzed with a fast Fourier transform to infer a phase angle between the two signals. An estimate of lag time is then computed from the phase angle, and the signals are adjusted to bring the lag time to zero.

In the genetic algorithm technique, the uniformly sampled video and audio time series signals are randomly adjusted over a number of iterations. In each iteration, the time series signals are adjusted in a positive or negative direction, and an overall synchronization score for the time series signals is evaluated. Adjustments that improve the overall synchronization score are retained for the subsequent iteration, while adjustments that do not improve the overall synchronization score are discarded. The iterations repeat until a threshold indicating a sufficient overall synchronization score is satisfied. The adjustments gradually reduce in size from iteration to iteration in order to prevent oscillations that hop over a satisfactory overall synchronization score.

Once the synchronization technique has completed, the uniformly sampled video and audio time series signals are synchronized, and ready for analysis with ML pattern recognition. The resulting synchronous, uniformly sampled database of time series signals TSS includes a number of time series signals $N_{TSS}$. In one embodiment, the synchronous, uniformly sampled database of time series signals TSS includes signals resampled from the signals representing the pixels VTSS and the audio ATSS, and the number of time series signals $N_{TSS}$ includes the number of time series signals representing the audio $N_{ATSS}$ and the number or time series signals representing the pixels $N_{VTSS}$ ($N_{TSS}=N_{ATSS}+N_{VTSS}$).

—ML Production of Residuals—

The deepfake detection systems and methods described herein analyze the synchronous, uniformly sampled database of time series signals TSS with an ML model. In one embodiment, the ML model is an ML pattern recognition model. In one embodiment, the ML model is implemented as a one or more non-linear non-parametric (NLNP) regression algorithms used for multivariate anomaly detection, for example similarity-based modeling (SBM) such as the multivariate state estimation technique (MSET) (including Oracle's proprietary Multivariate State Estimation Technique (MSET2)). Thus, in one embodiment, the ML model is a NLNP model such as an MSET model.

In one embodiment, the deepfake detection systems and methods input (e.g., in real time) the synchronously-sampled universe of transformed dynamic time series signals into the ML model and analyzes the input time series signals with NLNP pattern recognition, creating a database of synchronous digitized residuals. The ML model estimates or predicts what each of the database of derived and transformed time-series A/V signals should be or is expected to be based on training segments of videos of the person providing the televised speech.

Training of the ML model may be performed as an initial process prior to analysis of the audio/visual broadcast based on a library of past videos of subject of the video. Training may also be performed in real time to detect deepfake injections into a real time audio/visual broadcast even for subjects for whom there are not a library of past videos.

The ML model is a multivariate model that accepts input values for multiple variables and produces estimates of for the value of a variable based on input values for other variables. In one embodiment, the ML model includes a variable for each time series signal in the set of time series signals discussed above with reference to process block 210. In other words, in one embodiment, the ML model includes a variable for each color channel of each pixel of a frame of the video content, and a variable for each audio-frequency range (bin) of the audio content. For example, where a frame of the video content is 426×240 three-channel pixels, the number of variables is 57,600 (as discussed below with reference to Table 1). Thus, the ML model is configured to predict the value of variable 1 based on one or more of variables 2 through 57,600, and so on for all the variables. Training for the variables may be completed in parallel on multiple processing devices.

The ML model is trained to produce estimates of what the values of variable should be based on training with a reference set of time series signals from authentic audio-visual content of the human speaker speaking. To train the ML model, the reference set of time series signals for each variable are provided to the ML model. During training, a series of sets of reference values for the variables, each set including one reference value from each of the reference time series signals in the set, are provided in turn to the ML model. A configuration of correlation patterns between the variables of the ML model is automatically adjusted based on the reference values so as to cause the ML model to produce accurate estimates for each variable based on inputs to other variables. Because the reference set of time series signals is taken from audio-visual content in which the human speaker is genuinely speaking, without deepfake modifications, the ML model is thus configured to produce estimates that are consistent with authentic speech by the human speaker. The ML model has thus learned correlation patterns between variables that indicate when speech by the human speaker is authentic and free of deepfake injection of words or changes to mouth, facial, or other motions of the speaker.

In one embodiment, the ML model may be trained from prior videos of the person. In this case, the reference set of time series signals are from a reference audio-visual recording of the human speaker speaking. The reference audio-visual recording of the human speaker speaking has been confirmed to be authentic speech and movement by the human speaker that is free of both inserted words and adjustments to mouth, face, or other movement by the speaker. The reference set of time series signals is converted from the reference audio-visual recording in the same manner as described above, for example with reference to process block 210. This reference set of time series signals may be provided as inputs to the variables of the ML model during training to cause the ML model to be automatically configured to produce estimates that are consistent with the authentic speech and movement exhibited by the speaker in the reference audio-visual recording.

Or, in one embodiment, the ML model may be trained from a beginning or early portion of the live transmission of the audio-visual content. In this case, training is incrementally built following a bootstrapping approach. Early portions of a speech often include introductory remarks that are unlikely to be targets for surreptitious deepfake adjustment, but provide examples of speech by the human speaker. Thus, this speech by the speaker near the beginning of the audio-visual content may be assumed to be authentic speech and movement by the human speaker that is free of inserted words or adjustments to movement by the speaker. A time range of the audio-visual content beginning at or shortly after the time that the person begins speaking may be designated to be a training portion of the audio-visual content. For example, 2500 video frames of the human speaker speaking may be sufficient to train the ML model, while only covering 104 seconds of the speech (at a video frame rate of 24 frames per second). As the training portion of the audio visual content arrives, the training portion of the audio-visual content is converted to reference values for the variables, generating a set of streaming reference time series signals for the variables (for example as described in process block 210). The ML model is trained with the streaming reference time series signals through the end of the training range of the audio-visual content. At the completion of the training range, the ML model has been configured to produce estimates that are consistent with the authentic speech and movement exhibited by the speaker at the beginning of the speech. The ML model then transitions from training to surveillance or real-time inferencing of deepfake presence. The ML model proceeds to produce estimates of authentic content for a surveillance range of the audio-visual content following the training range.

After training and during real time inferencing, each signal in the comprehensive database of transformed, merged, resampled time series signals is estimated using learned correlation patterns with all other $N_{TSS}-1$ signals. The estimates generated by the ML model for variables are used to produce residual values for the variables. Once estimates are produced for all $N_{TSS}$ signals, the estimates are subtracted from the real transformed signals. This gives point-wise differences, referred to herein as "residuals." The values of the residuals indicate how greatly the signal values input to the ML model differ from values consistent with authentic speech and movement by the human speaker. The continuous element-by-element pairwise differences between predicted (estimated) and real-time (observed) values for the synchronous, uniformly sampled database of time series signals TSS creates a database of $N_{TSS}$ "residual signals."

—Residuals Array Structure for Deepfake Detection—

The residuals at any one point or observation in time may be stored in a rectangular grid. In one embodiment, the residual values at one observation of the $N_{TSS}$ signals may be laid out in a two-dimensional (2D) rectangular array (or matrix or grid) for processing. At this step in the analysis, the 2D array of residuals is "static," that is, it represents a particular point in time or a single observation. For example, the static 2D array of residuals may correspond to a frame of the video signal. The innovative residual processing is done for each fixed point in time as each frame of video gets ingested. Hence for this residual-processing step, there is a static 2D array of residual values. The analysis for the static 2D array representing a frame may be represented conceptually as an inner loop in one embodiment of a deepfake detection method. The temporal aspects of the deepfake detection method may be represented conceptually in an outer loop that is triggered by each new video frame coming in (accompanied by audio content that later gets synchronized to the frame processing rate of the video streams as described above). The temporality or aspects of the deepfake detection method relating to change over time occur in the outer-loop recursive processing. But at this point in the residual processing, the 2D array of $N_{TSS}$ signal values is static in time, representing the residuals for one contemporaneous observation of all signals in synchronous, uniformly sampled database of time series signals TSS.

Figure 3:
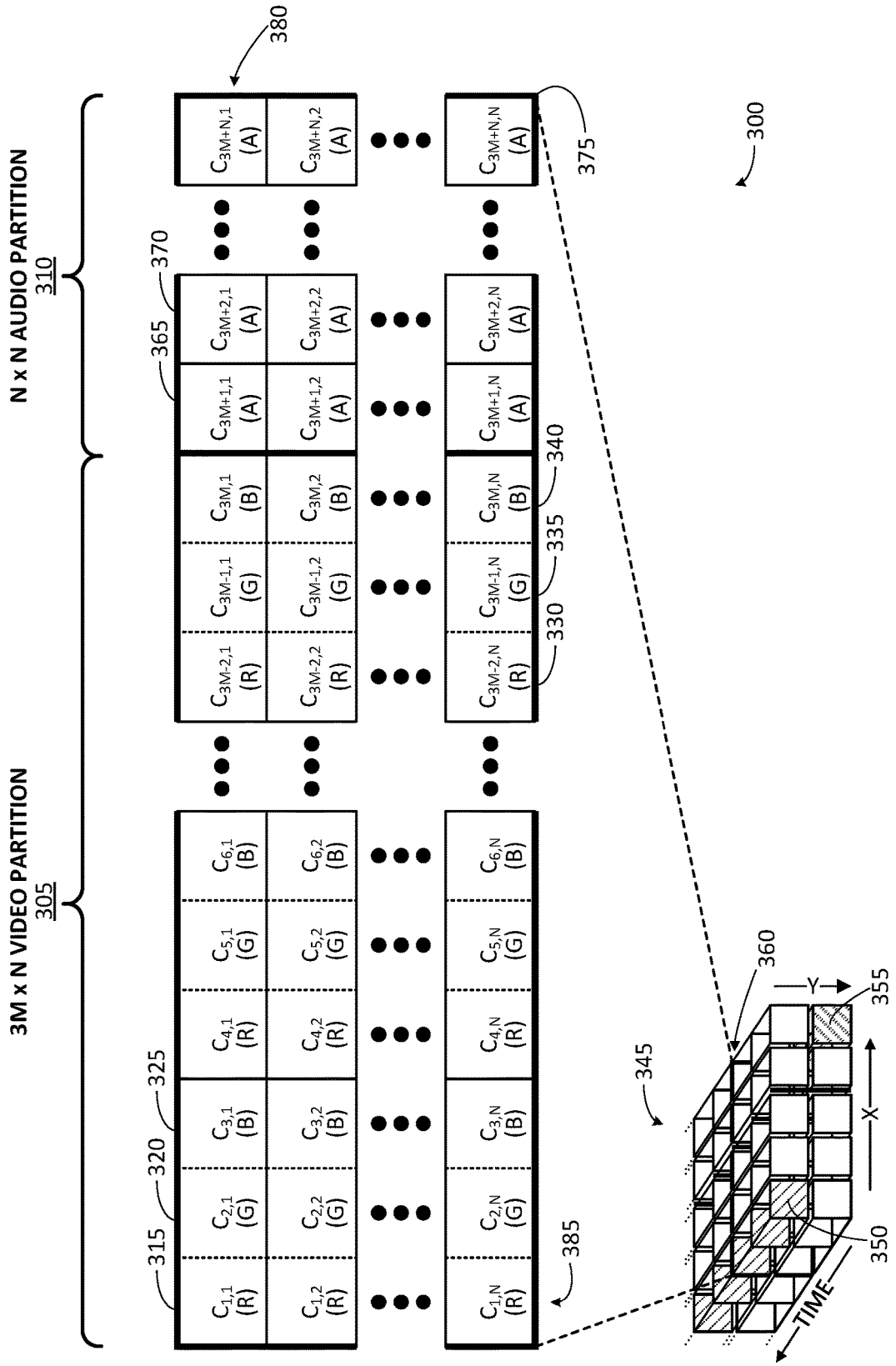
FIG. 3 illustrates an example two-dimensional static array for one observation associated with autonomous deepfake detection.

Referring now to FIG. 3, an example 2D static array 300 for one observation associated with autonomous deepfake detection is shown. The static array 300 In one embodiment, the inner-loop "static array" residual analysis uses a particular X-Y orientation of the residuals for the $N_{TSS}$ signals in a static 2D array. The static array represents one synchronous observation for all the various video and audio signals. The layout of the merged transformed visual and audio signals in the static array is such that the transformed video timeseries retain the spatial layout of the original pixels. In one embodiment, the layout of the static array is a matrix array with two partitions: a 3M×N video partition 305, and an N×N audio partition 310. The static array thus has dimensions of (3M+N)×N.

Video partition 305 of the static array 300 retains the spatial layout of a video frame of the video signal. Recall that a frame of video in the video signal has a specific rectangular grid of M by N pixels. When the spatiotemporal transformation of these M×N pixels is done (creating 3×M×N time series), each pixel in the video signal in the original M×N rectangular layout is represented by three time series signals, quantitatively representing the Red-Green-Blue metrics. In the transformed spatiotemporal video signals, the exact spatial grid is retained as the original M×N video frame layout using 3M×N cells of video partition 305.

Each pixel is represented by a sequence of three cells—a red cell for the pixel, a green cell for the pixel, and a blue cell for the pixel—in a grid location corresponding to the pixel location. For example, pixel (1,1) of a video signal is represented in video partition 305 by cell $C_{1,1}$ 315 for the red value of pixel (1,1), cell $C_{2,1}$ 320 for the green value of pixel (1,1), and cell $C_{3,1}$ 325 for the blue value of pixel (1,1); and pixel (M,N) of the video signal is represented by cell $C_{3M-2,N}$ 330 for the red value of pixel (M,N), cell $C_{3M-1,N}$ 335 for the green value of pixel (M,N), and cell $C_{3M,N}$ 340 for the blue value of pixel (M,N). Other pixels of the video signal are also represented by the three R-G-B signal values in video partition 305 in locations that similarly correspond to the location of the original pixel. Generally, the pixel of the video frame corresponding to a cell in video partition 305 is the pixel in the video frame that has the same N coordinate value in the video frame as the cell in video partition 305, and having an M coordinate value in the video frame that is the integer quotient of dividing the M coordinate value for the cell in video partition 305 by 3.

Retaining the N×M video frame layout enables root cause explain-ability of deepfake alerts. When a deepfake alert occurs, a pixel location or region within the video frame that caused the alert can be indicated. If instead of retaining the N×M video frame layout, the deepfake detection system were to simply place all the video residuals in a one-dimensional (1 D) array or in any convenient unstructured blob of residual values, deepfake alerts could still be triggered, but explain-ability of the deepfake alerts would become difficult or intractable. So when the X-Y 2D static array 300 (or matrix or grid) of residuals is formed, the video partition 305 of this rectangular grid of residuals retains the rectangular structure of the original pixel grid.

Static array 300 is an array view of a synchronous observation of a synchronous, uniformly sampled time series database 345. Time series database 345 is made up of individual component time series signals, such as video time series signal (1,1) 350 and audio time series signal (N,3M+N) 355. As mentioned above, static array 300 represents a synchronous observation 360 or "slice" across the time series signals for all the various video and audio signals. Static array 300 is therefore made up of the values at a synchronous observation having a time stamp in common in each of the component video and audio time series signals in time series database 345.

Audio partition 310 of the static array 300 stores audio values in a 2D rectangular (in this case, a square), N×N matrix structure. While audio values could be processed in a linear array, creating the N×N matrix greatly facilitates the analysis of the residuals, as described below. The transformed audio signals (from the frequency-domain-to-time-domain transformation discussed above) are stored in a square N×N array, where N is the number of pixels on the smaller edge of the N×M rectangular grid of original pixels. In the frequency-domain-to-time-domain transformation discussed above, the frequency axis is divided into a number of bins for analysis.

Each bin is represented by one cell. The bins may be ordered within the cells of audio partition 310 from left-to-right along the X-axis of static array 300, and wrap top-to-bottom along the Y-axis of static array 300, or follow another order or arrangement as convenient. For example, bin 1 of an audio spectrum is represented in audio partition 310 by cell $C_{1,3M+1}$ 365, bin 2 by cell $C_{1,3M+2}$ 370, and so on through bin N×N at cell $C_{N,3M+N}$ 375.

There is no spatial relevance to the cell locations for the transformed audio timeseries, but there is a computational advantage by creating a "square" N×N grid of residuals for the transformed audio time series, and partitioning this square grid adjacent to the previously defined N×M rectangular array (where the shared partition boundary is the shorter "N" dimension). For the deepfake detection systems and methods described herein, a tremendous overall compute boost (that is, a reduction in processor time) is enabled by choosing the number of bins Nans to be N×N or $N^2$, where N is the smaller of the N×M pixel layout for the video. Compute boosts are also available for numbers of bins $N_{Bins}$ that are other positive integer multiples of N. Numbers of bins smaller than N×N may exhibit lower sensitivity to deepfakes than N×N.

Now at this point in the processing, a rectangular array of residuals has been created, where one side of the rectangle has N values, and the longer side of the rectangle has (3M+N) values, for example as shown and described for static array 300. Thus, static array 300 is a rectangular array having multiple cells along each dimension. The "left side" of this residual array is a video partition that holds the transformed video spatiotemporal values, with a layout of N×3M (preserving the spatial layout of the original N×M pixels). The "right side" of this residual array is an audio partition that holds the Freq-Time transformed audio signals in a square N×N array. As discussed above, the spatial layout for the audio signals is not necessary for deepfake detection, but constructing the residual array in this manner facilitates analysis of the residuals to detect deepfakes in the next step.

Thus, the dimensions of static array 300 and number of bins $N_{Bins}$ are determined by the frame size of the video signal. Example dimensions of static array 300 and number of audio frequency bins $N_{Bins}$ are given in Table 1:

TABLE 1

| Video Frame Size (M × N) | Array Dimens. ((3M + N) × N) | Number of Bins (N²) |
|---|---|---|
| 426 × 240 pixels (px.) | 1518 × 240 cells | 57,600 |
| 640 × 360 px. | 2280 × 360 cells | 129,600 |
| 854 × 480 px. (SD) | 3042 × 480 cells | 230,400 |
| 1280 × 720 px. (HD) | 4650 × 720 cells | 518,400 |
| 1920 × 1080 px. (Full HD) | 6840 × 1080 cells | 1,166,400 |
| 2048 × 1080 px. (2K) | 7224 × 1080 cells | 1,166,400 |
| 2560 × 1440 px. (QuadHD) | 9120 × 1440 cells | 2,073,600 |
| 3840 × 2160 px. (UltraHD) | 13,680 × 2160 cells | 4,665,600 |
| 4096 × 2160 px. (4K) | 14,448 × 2160 cells | 4,665,600 |
| 5120 × 2880 px. (5K) | 18,240 × 2880 cells | 8,294,400 |
| 7680 × 4320 px. (8K) | 27,360 × 4320 cells | 18,662,400 |

Array dimensions and the number of bins may thus become quite large.

—Static Array Residual Analysis—

Because the values of static array 300 are the residuals between estimated and actual signal values at a given observation, the values of static array 300 represent a three-dimensional residual surface for that observation. The residual surface may be examined with a two-dimensional sequential probability ratio test (2D SPRT) (or other sequential analysis in two dimensions) to determine whether the residual surface indicates the presence of deepfake content. As discussed above, the observations correspond to frames of the video signal. Accordingly, the residual surface represents how far the actual video and audio time series signal values differ from expected video and audio time series signal values at one frame. The residuals are therefore analyzed with the 2D SPRT a single frame (or static array) at a time.

In general, the sequential probability ratio test (SPRT) is a form of sequential analysis for analyzing a sample of un-fixed size until finding a result that satisfies a pre-determined threshold for a significant result. The sequential probability ratio test (SPRT) detects anomalous deviations from normal residuals by calculating a cumulative sum of the log-likelihood ratio for each successive residual between the actual signal values and estimated signal values, and comparing the cumulative sum against a threshold at which to determine that an anomaly is detected. Where the cumulative sum of the log-likelihood ratio crosses the threshold, an alarm is issued.

To detect deepfake content in the static array 300, the deepfake detection system runs a SPRT across the residual values in both the x-dimension and the y-dimension of the static array 300. For the x-dimension, a SPRT is applied to the residual values in each row of the static array. For example, for a row 380 in the x-dimension y=1, a SPRT is applied to the sequence of residual values in the y-dimension cells $C_{1,1}, C_{1,2}, C_{1,3}, \ldots C_{1,3}M+N$. This process is repeated for rows from row 1 through row N (y=1, 2, . . . , N) in static array 300. The process may be repeated (sequentially, or in parallel) as separate SPRT tests per row. Or, the process may be performed as one SPRT test for the values wrapping from row to row by incrementing the value of y and resetting the value of x once the final value of x (i.e., 3M+N) for the row is reached.

Similarly for the y-dimension, a SPRT is applied to the residual values in each column of the static array. For example, for a column 385 in the y-dimension x=1, a SPRT is applied to the sequence of residual values in the x-dimension cells $C_{1,1}, C_{2,1}, \ldots C_{N,1}$. This process is repeated for columns from column 1 through column 3M+N (x=1, 2, . . . , 3M+N). T The process may be repeated (sequentially, or in parallel) as separate SPRT tests per column. Or, the process may be performed as one SPRT test for the values wrapping from column to column by incrementing the value of x and resetting the value of y once the final value of y (i.e., N) for the row is reached. Thus, every value in the residual surface is evaluated by two separate SPRTs: an x-dimension SPRT and a y-dimension SPRT. Where the SPRT in either dimension issues an alarm, deepfake activity has been detected.

The 2D SPRT is not a function of time. As discussed above, the array of residuals is static in time, representing the results of analysis for just one observation or frame. Instead of SPRT on a temporal dimension, N simultaneous SPRT tests are performed across the horizontal array (x-dimension) of numerical values in static array of residuals (as discussed above). And simultaneously 3M+N SPRT tests are performed across the Y dimension. Because the SPRT tests are performed for residual values for one observation or frame, the SPRT tests may be performed simultaneously, that is, concurrently in time, in parallel.

Computational performance using SPRTs is good: SPRTs are computationally light weight and SPRT computations are highly parallel. Therefore, N and 3M+N are able to scale to very large sizes (e.g., for megapixel high-definition video quality) on parallel processing CPU or GPU processors.

Figure 4A:
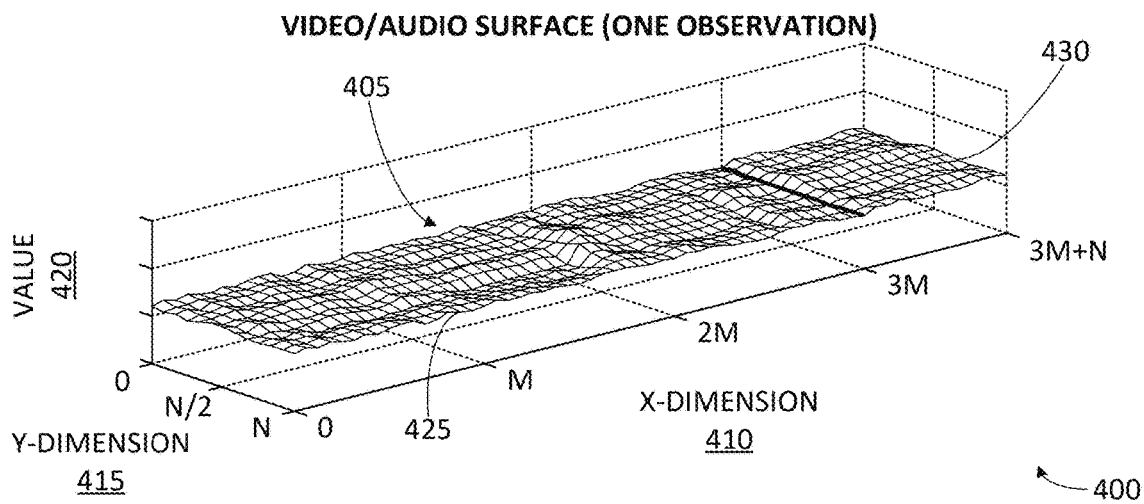
FIG. 4A illustrates a three-dimensional plot of an example video/audio surface of video and audio signal values at one observation of a synchronous, uniformly sampled database of time series signals.

FIG. 4A shows a 3D plot 400 of an example video/audio surface 405 of video and audio signal values at one observation (or frame) of a synchronous, uniformly sampled database or set of time series signals (such as database TSS discussed above). Video/audio surface 405 shows the spatiotemporally-transformed video and frequency-time-transformed audio time series in an array frozen at one time step for illustration of the 2D SPRT analysis. To form video/audio surface 405, signal values for the time series signals are arranged in a 2D rectangular array as discussed above with reference to FIG. 3. Therefore, video/audio surface 405 is 3M+N cells or positions wide in x-dimension 410, and N cells or positions deep on y-dimension 415. The signal value at each cell or position is plotted against value axis 420. Video/audio surface 405 has a video partition 425 extending 3M cells or positions wide along the x-dimension 410. Video/audio surface 405 has an audio partition 430 extending N cells or positions wide along the x-dimension 410.

Figure 4B:
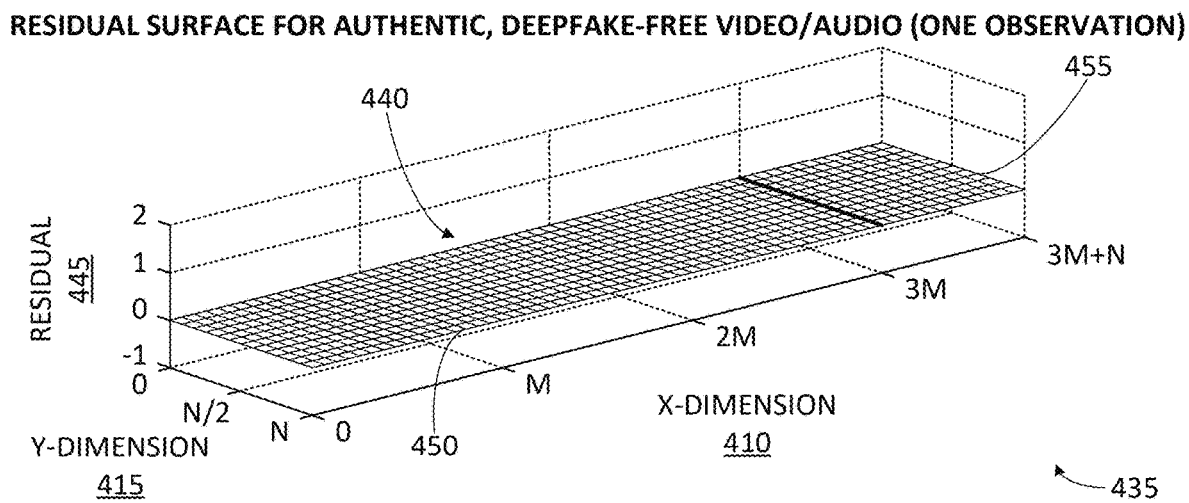
FIG. 4B illustrates a three-dimensional plot of an example residual surface for audio-visual content that is consistent with authentic speech by a human speaker.

FIG. 4B shows a 3D plot 435 of an example residual surface 440 for audio-visual content that is consistent with authentic speech by a human speaker. Residual surface 440 is an illustration of what a residual array looks like for authentic, real-time streaming audio/visual of a person for whom the ML pattern recognition model has been trained. While the person talking in the video/audio is still the authentic person speaking with his or her own authentic voice (that is, not an impersonator nor a synthesized voice), the residual surface for each observation is a flat surface with some small random noise on it, as shown by residual surface 440. Residual surface 440 is made up of values of residuals between actual value and ML-predicted value for each video and audio signal at one observation (or frame) of a synchronous, uniformly sampled database of time series signals. In residual surface 440, the residuals are arranged in a 2D rectangular array as discussed above with reference to FIG. 3. Residual surface 440 is 3M+N cells or positions wide in x-dimension 410, and N cells or positions deep on y-dimension 415. The residual value at each cell or position is plotted against residual axis 445. Residual surface 440 has a video partition 450 extending 3M cells or positions wide along the x-dimension 410 and an audio partition 455 extending N cells or positions wide along the x-dimension 410.

Figure 4C:
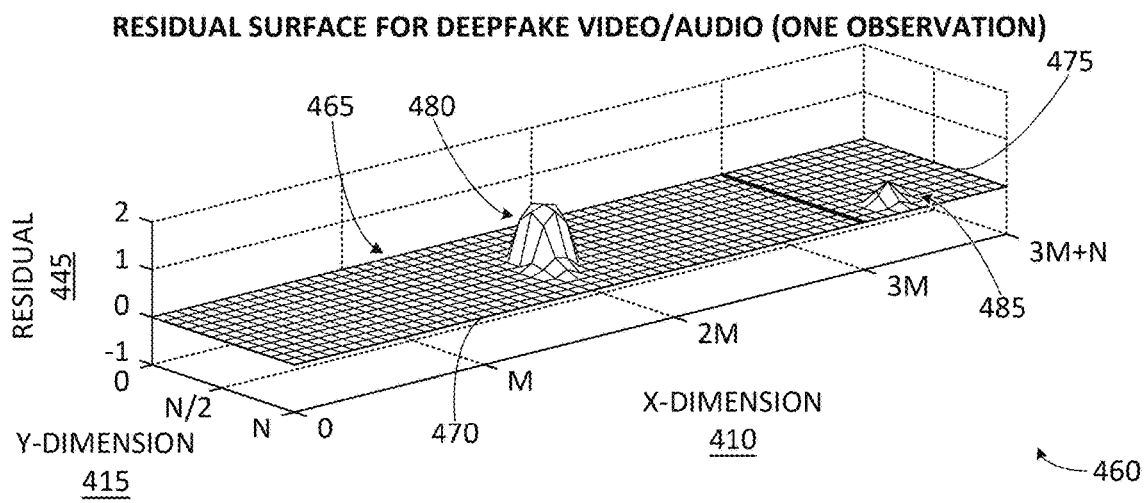
FIG. 4C shows a three-dimensional plot of an example residual surface for audio-visual content that contains anomalies that indicate deepfake modifications.

FIG. 4C shows a 3D plot 460 of an example residual surface 465 for audio-visual content that contains anomalies that indicate deepfake modifications. As with residual surface 440, the residuals of residual surface 465 are arranged in a 2D rectangular array that is 3M+N cells or positions wide in x-dimension 410, and N cells or positions deep on y-dimension 415, with the residual value at each cell plotted against residual axis 445. Residual surface 465 has a video partition 470 extending 3M cells or positions wide along the x-dimension 410 and an audio partition 455 extending an additional N cells or positions wide along the x-dimension 410.

Residual surface 465 is an illustration of what a residual array looks like for real-time streaming audio/visual of the person that includes deepfake content. Where there is an injection of video and/or audio to create a deepfake, there arise one or more "humps" or spikes in the residual surface. At the humps or spikes, the residual values become significantly larger than the background flat surface with small random noise. For example, a first hump 480 occurs in video partition 470, indicating the presence of deepfake video content at the pixels represented by the cells included in hump 480. And, for example, a second hump 485 occurs in audio partition 475, indicating the presence of deepfake audio content in the frequency bins represented by the cells included in hump 485.

2D SPRT examination of the residual values in rows and columns of residual surface 465 will generate alerts for residual values within either hump 480 or hump 485. Although one could impose thresholds above and below the residual surface and alert whenever humps, bumps, spikes, or other patterns in the residuals exceed a high/low threshold, there is a tremendous advantage in using a double-dimensional simultaneously executing SPRT: it has been proven that the SPRT achieves the mathematically lowest possible false-alarm and missed-alarm probabilities. Low false-alarm and missed-alarm probabilities enhance the functional capability of making authentic vs. deepfake decisions.

—Example Deepfake Detection Process—

Figure 5:
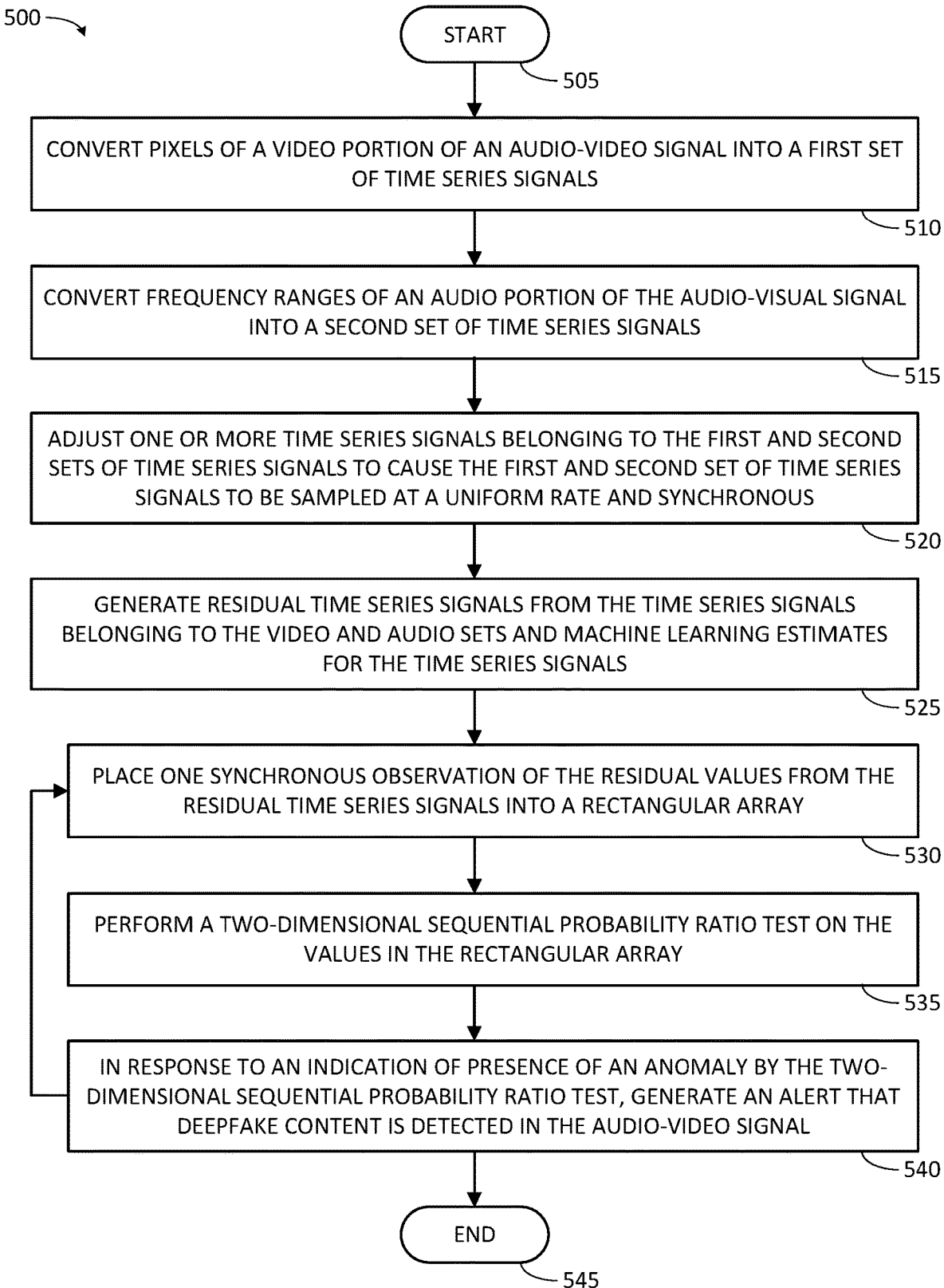
FIG. 5 illustrates an additional example method for deepfake detection associated with autonomous deepfake detection.

FIG. 5 illustrates an additional example method for deepfake detection 500. In one embodiment, method for deepfake detection 500 initiates at start block 505 in response to a processor of a computer determining that method 500 should commence, for example in response to occurrence of a condition discussed above for commencing method 200. In one embodiment, the computer is configured by computer-executable instructions to execute functions of deepfake detection system 100.

At process block 510, method 500 converts pixels of a video portion of an audio-video signal into a first set of time series signals, for example as shown and described above with reference to process block 210 and under the heading "Conversion to Time Series Signals." At process block 515, method 500 converts frequency ranges of an audio portion of the audio-visual signal into a second set of time series signals, also for example as shown and described above with reference to process block 210 and under the heading "Conversion to Time Series Signals."

At process block 520, method 500 adjusts one or more time series signals belonging to the first and second sets of time series signals to cause the first and second set of time series signals to be sampled at a uniform rate and synchronous. The adjustment may include resampling of the time series signals for example as shown and described above under the heading "Resampling Time Series at a Uniform Rate." The adjustment may also include synchronizing the resampled signals for example as shown and described above under the heading "Synchronizing Time Series Signals."

At process block 525, method 500 generates residual time series signals from the time series signals belonging to the video and audio sets and machine learning estimates of the time series signals, for example as shown and described above with reference to process block 215 and under the headings "ML Production of Residuals" and "ML Production of Residuals."

At process block 530, method 500 places one synchronous observation of the residual values from the residual time series signals into a rectangular array, for example as shown and described above with reference to process block 220 and under the heading "Residuals Array Structure for Deepfake Detection." At process block 535, method 500 performs a two-dimensional sequential probability ratio test on the values in the rectangular array, for example as shown and described above with reference to process block 225 and under the heading "Static Array Residual Analysis." At process block 540, in response to an indication of presence of an anomaly by the two-dimensional sequential probability ratio test, method 500 generates an alert that deepfake content is detected in the audio-video signal, for example as shown and described above with reference to process block 230. Process blocks 530-540 may repeat in a loop for a sequence of synchronous observations of the residual time series signals while there remains a subsequent observation of the residual time series signals. When there are no further observations of residual values available from the residual time series signals, method 500 continues to end block 545 and completes.

—Selected Advantages—

The deepfake detection systems and methods described herein offer a number of advantages. Prototype analyses of the deepfake detection systems and methods demonstrate clear advantages over neural network (NN) attempts to detect deepfake audio/video injections.

In one embodiment, the deepfake detection systems and methods detect injection of deepfake segments with a much higher fidelity and much lower false-positive and false-negative probabilities than can be achieved by neural-network-based approaches to deepfake detection. Also, in one embodiment, the deepfake detection systems and methods far outperform human experts watching the audio/video presentations. For example, the deepfake detection systems and methods detect inserted deepfake content on the first observation or video frame by which it appears, and the detection is not subjective.

Applying neural-network-based solutions to megapixel or other high-definition fine-grain video/audio analyses is not computationally feasible. Neural networks require huge computer clusters to be able to scale to even to small pixel grids. This is especially so at the frame rate needed to keep up with audio voice recognition: kHz sampling intervals. Neural-network-based tools for multivariate anomaly detection are often limited or capped as to the number of input time series signals, for example no more than 300 time series signals. Neural networks generally, and in particular long short-term memory (LSTM) neural networks, "choke" on and are unable to process more than a few hundred time series signals. This is inadequate to analyze any but the very lowest resolution video. By contrast, the deepfake detection systems and methods described herein scales to millions of time series signals.

Thus, there is an orders-of-magnitude scalability gap between the deepfake detection systems and methods described herein and other ML approaches. Neural networks (NN) as well as support vector machines (SVM) are very limited in scalability because these solutions use stochastic optimization of the weights, and hence cannot be fine-grain parallelized on multi-thread multi-core CPUs or GPUs. NN and SVM ML analysis of megapixel correlated RGP pixel content requires inter-process communication in the ML, and is not amenable to fine-grain multivariate parallelism. By contrast, the deepfake detection systems and methods described herein employ a deterministic math algorithm (MSET or other SBM) that naturally parallelizes on modern multi-thread, multi-core CPUs and GPUs. In short, NN and SVM approaches to identifying deepfake content are not scalable even to the number of pixels in even the lowest resolution video, while, in one embodiment, the deepfake detection systems and methods described herein are scalable to very high resolutions, for example up to 8K video or more.

In one embodiment, the novel and innovative transformations described herein for spatiotemporally transforming high-definition pixel-granularity and frequency-to-time domain transforming high-fidelity acoustic voice patterns into separate clusters of time-series signals, followed by an analytical resampling process to merge the clusters into a synchronous, uniformly sampled time series database enables the frame-by-frame 2D SPRT analysis to detect deepfake content by its location in video frame and audio frequency bin. Thus, unlike any other ML technique, in one embodiment the deepfake detection systems and methods described herein can simultaneously perform frequency-domain-to-time-domain transformation of acoustic signals, spatiotemporal transformation of high-density video content into pixel-level RGB timeseries, and produce a master array of transformed time-series that can then be analyzed with a novel 2D SPRT technique in a final Authentic-vs-Fake sequential decision process with ultra-low false positives and false negatives.

Due to the readily parallelizable nature of the deepfake detection systems and methods described herein, deepfake content can be detected in real-time, streaming audio/video, and is scalable to high video resolutions.

—Cloud or Enterprise Embodiments—

In one embodiment, the present system (such as deepfake detection system 100) is a computing/data processing system including a computing application or collection of distributed computing applications for access and use by other client computing devices that communicate with the present system over a network. In one embodiment, deepfake detection system 100 is a component of a time series data service that is configured to gather, serve, and execute operations on time series data. The applications and computing system may be configured to operate with or be implemented as a cloud-based network computing system, an infrastructure-as-a-service (IAAS), platform-as-a-service (PAAS), or software-as-a-service (SAAS) architecture, or other type of networked computing solution. In one embodiment the present system provides at least one or more of the functions disclosed herein and a graphical user interface to access and operate the functions. In one embodiment deepfake detection system 100 is a centralized server-side application that provides at least the functions disclosed herein and that is accessed by many users by way of computing devices/terminals communicating with the computers of deepfake detection system 100 (functioning as one or more servers) over a computer network. In one embodiment deepfake detection system 100 may be implemented by a server or other computing device configured with hardware and software to implement the functions and features described herein.

In one embodiment, the components of deepfake detection system 100 may be implemented as sets of one or more software modules executed by one or more computing devices specially configured for such execution. In one embodiment, the components of deepfake detection system 100 are implemented on one or more hardware computing devices or hosts interconnected by a data network. For example, the components of deepfake detection system 100 may be executed by network-connected computing devices of one or more compute hardware shapes, such as central processing unit (CPU) or general purpose shapes, dense input/output (I/O) shapes, graphics processing unit (GPU) shapes, and high-performance computing (HPC) shapes.

In one embodiment, the components of deepfake detection system 100 intercommunicate by electronic messages or signals. These electronic messages or signals may be configured as calls to functions or procedures that access the features or data of the component, such as for example application programming interface (API) calls. In one embodiment, these electronic messages or signals are sent between hosts in a format compatible with transmission control protocol/internet protocol (TCP/IP) or other computer networking protocol. Components of deepfake detection system 100 may (i) generate or compose an electronic message or signal to issue a command or request to another component, (ii) transmit the message or signal to other components of deepfake detection system 100, (iii) parse the content of an electronic message or signal received to identify commands or requests that the component can perform, and (iv) in response to identifying the command or request, automatically perform or execute the command or request. The electronic messages or signals may include queries against databases. The queries may be composed and executed in query languages compatible with the database and executed in a runtime environment compatible with the query language.

In one embodiment, remote computing systems may access information or applications provided by deepfake detection system 100, for example through a web interface server. In one embodiment, the remote computing system may send requests to and receive responses from deepfake detection system 100. In one example, access to the information or applications may be effected through use of a web browser on a personal computer or mobile device. In one example, communications exchanged with deepfake detection system 100 may take the form of remote representational state transfer (REST) requests using JavaScript object notation (JSON) as the data interchange format for example, or simple object access protocol (SOAP) requests to and from XML servers. The REST or SOAP requests may include API calls to components of deepfake detection system 100.

—Computing Device Embodiment—

Figure 6:
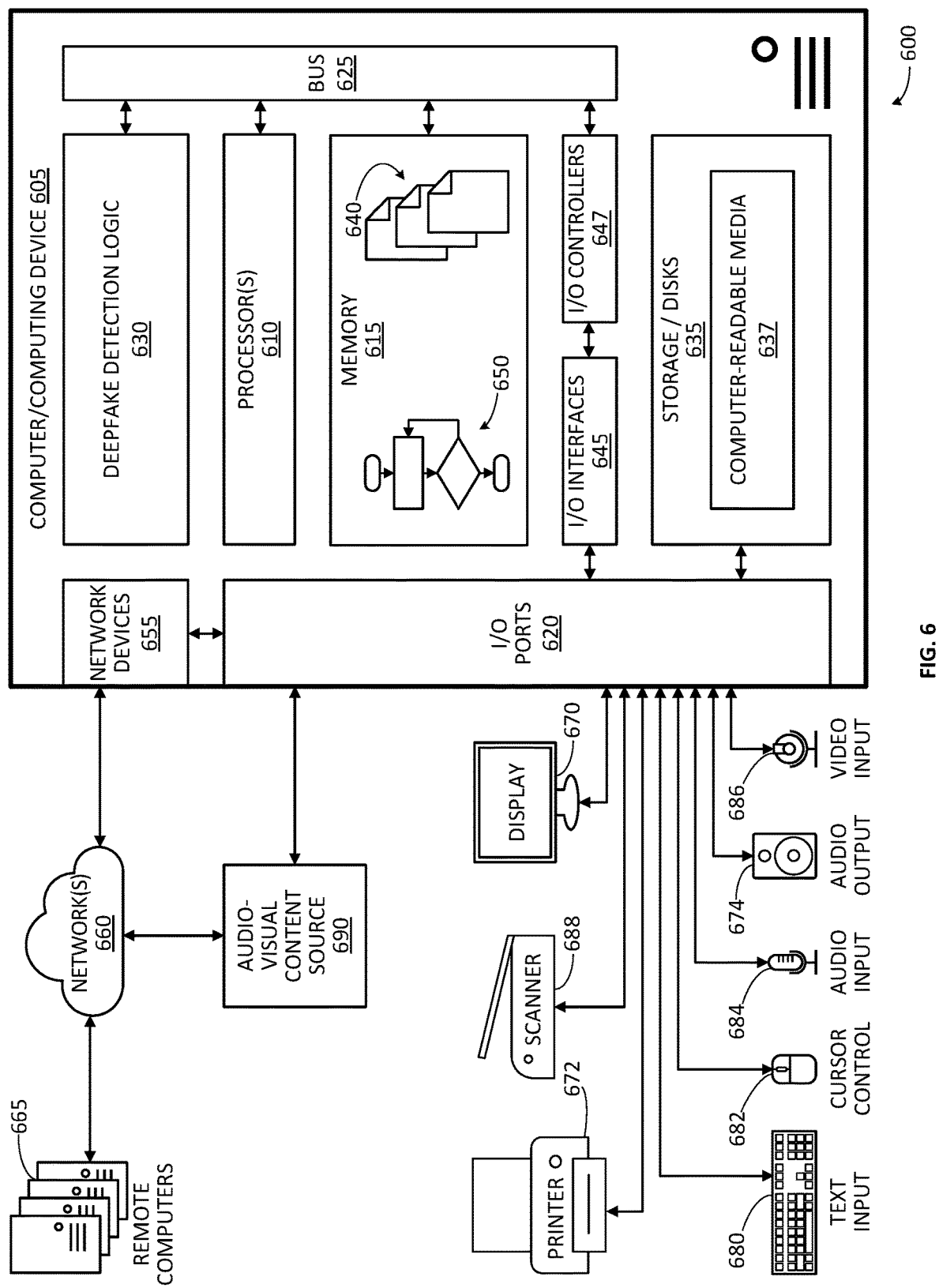
FIG. 6 illustrates an embodiment of a computing system configured with the example systems and/or methods disclosed.

FIG. 6 illustrates an example computing system 600 that is configured and/or programmed as a special purpose computing device with one or more of the example systems and methods described herein, and/or equivalents. The example computing device may be a computer 605 that includes one or more processors 610, a memory 615, and input/output ports 620 operably connected by a bus 625. In one example, the computer 605 may include deepfake detection logic 630 configured to facilitate autonomous deepfake detection based on multivariate spatiotemporal characterization and analysis of video and integrated audio similar to the logic, systems, and methods shown and described with reference to FIGS. 1-5. In different examples, the logic 630 may be implemented in hardware, a non-transitory computer-readable medium with stored instructions 637, firmware, and/or combinations thereof. While the logic 630 is illustrated as a hardware component attached to the bus 625, it is to be appreciated that in other embodiments, the logic 630 could be implemented in the processor 610, stored in memory 615, or stored in disk 635. In one embodiment, multiple processors 610 and/or multiple logics 630 may operate in parallel to simultaneously execute tasks (such as parallel execution of SPRT on sequences of values in individual rows and columns of a two-dimensional array, as discussed above with reference to process block 225).

In one embodiment, logic 630 or the computer is a means (e.g., structure: hardware, non-transitory computer-readable medium, firmware) for performing the actions described. In some embodiments, the computing device may be a server operating in a cloud computing system, a server configured in a Software as a Service (SaaS) architecture, a smart phone, laptop, tablet computing device, and so on.

The means may be implemented, for example, as an ASIC programmed to autonomously detect deepfake modifications to audio-visual content. The means may also be implemented as stored computer executable instructions that are presented to computer 605 as data 640 that are temporarily stored in memory 615 and then executed by processor 610.

Logic 630 may also provide means (e.g., hardware, non-transitory computer-readable medium that stores executable instructions, firmware) for autonomously detecting deepfake modifications to audio-visual content.

Generally describing an example configuration of the computer 605, the processor 610 may be a variety of various processors including dual microprocessor and other multi-processor architectures. A memory 615 may include volatile memory and/or non-volatile memory. Non-volatile memory may include, for example, ROM, PROM, and so on. Volatile memory may include, for example, RAM, SRAM, DRAM, and so on.

A storage disk 635 may be operably connected to the computer 905 through, for example, an input/output (I/O) interface (e.g., card, device) 645 and an input/output port 620 that are controlled by at least an input/output (I/O) controller 647. The disk 635 may be, for example, a magnetic disk drive, a solid-state disk drive, a floppy disk drive, a tape drive, a Zip drive, a flash memory card, a memory stick, and so on. Furthermore, the disk 635 may be a CD-ROM drive, a CD-R drive, a CD-RW drive, a DVD ROM, and so on. The memory 615 can store a process 650 and/or a data 640, for example. The disk 635 and/or the memory 615 can store an operating system that controls and allocates resources of the computer 605.

In one embodiment, storage/disk 635 is configured for structured storage and retrieval of one or more collections of information or data in non-transitory computer-readable media, for example as one or more data structures. In one embodiment, storage/disk 635 includes one or more databases configured to store and serve information used by deepfake detection system 100. In one embodiment, storage/disk 635 includes one or more time-series databases configured to store and serve time-series data. In one embodiment, the time-series database is a not only SQL (NOSQL) database.

The computer 605 may interact with, control, and/or be controlled by input/output (I/O) devices via the input/output (I/O) controller 647, the I/O interfaces 645 and the input/output ports 620. The input/output devices may include one or more displays 670, printers 672 (such as inkjet, laser, or 3D printers), and audio output devices 674 (such as speakers or headphones), text input devices 680 (such as keyboards), a pointing and selection device 682 (such as mice, trackballs, touchpads, touch screens, joysticks, pointing sticks, stylus mice), audio input devices 684 (such as microphones), video input devices 686 (such as video and still cameras), video cards (not shown), disk 635, network devices 655, sensors (not shown), and so on. The input/output ports 620 may include, for example, serial ports, parallel ports, and USB ports.

In one embodiment, the computer 605 may be connected to an audio-visual content source 690. Audio-visual content source 690 may be a streaming service for transmitting streams of audio-visual signals to computing devices. Audio-visual content source 690 may by a broadcast receiver for collecting transmitted broadcast of audio-visual signals.

The computer 605 can operate in a network environment and thus may be connected to the network devices 655 via the I/O interfaces 645, and/or the I/O ports 620. Through the network devices 655, the computer 605 may interact with a network 660. Through the network 660, the computer 605 may be logically connected to remote computers 665, and to live, real time broadcast transmissions and/or streams of audio-visual content from audio-visual content source 690. Networks with which the computer 605 may interact include, but are not limited to, a LAN, a WAN, and other networks.

Definitions and Other Embodiments

In another embodiment, the described methods and/or their equivalents may be implemented with computer executable instructions. Thus, in one embodiment, a non-transitory computer readable/storage medium is configured with stored computer executable instructions of an algorithm/executable application that when executed by a machine(s) cause the machine(s) (and/or associated components) to perform the method. Example machines include but are not limited to a processor, a computer, a server operating in a cloud computing system, a server configured in a Software as a Service (SaaS) architecture, a smart phone, and so on). In one embodiment, a computing device is implemented with one or more executable algorithms that are configured to perform any of the disclosed methods.

In one or more embodiments, one or more of the components described herein are configured as program modules stored in a non-transitory computer readable medium. The program modules are configured with stored instructions that when executed by at least a processor cause the computing device to perform the corresponding function(s) as described herein.

In one or more embodiments, the disclosed methods or their equivalents are performed by either: computer hardware configured to perform the method; or computer instructions embodied in a module stored in a non-transitory computer-readable medium where the instructions are configured as an executable algorithm configured to perform the method when executed by at least a processor of a computing device.

In one embodiment, each step of computer-implemented methods described herein may be performed by a processor of one or more computing devices (i) accessing memory and (ii) configured with logic to cause the system to execute the step of the method. For example, the processor accesses and reads from or writes to the memory to perform the steps of the computer-implemented methods described herein. These steps may include (i) retrieving any necessary information, (ii) calculating, determining, generating, classifying, or otherwise creating any data, and (iii) storing for subsequent use any data calculated, determined, generated, classified, or otherwise created. References to storage or storing indicate storage as a data structure in memory or storage/disks of a computing device.

In one embodiment, each subsequent step of a method commences automatically in response to parsing a signal received or stored data retrieved indicating that the previous step has been performed at least to the extent necessary for the subsequent step to commence. Generally, the signal received or the stored data retrieved indicates completion of the previous step.

While for purposes of simplicity of explanation, the illustrated methodologies in the figures are shown and described as a series of blocks of an algorithm, it is to be appreciated that the methodologies are not limited by the order of the blocks. Some blocks can occur in different orders and/or concurrently with other blocks from that shown and described. Moreover, less than all the illustrated blocks may be used to implement an example methodology. Blocks may be combined or separated into multiple actions/components. Furthermore, additional and/or alternative methodologies can employ additional actions that are not illustrated in blocks. The methods described herein are limited to statutory subject matter under 35 U.S.C. § 101.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

A "data structure", as used herein, is an organization of data in a computing system that is stored in a memory, a storage device, or other computerized system. A data structure may be any one of, for example, a data field, a data file, a data array, a data record, a database, a data table, a graph, a tree, a linked list, and so on. A data structure may be formed from and contain many other data structures (e.g., a database includes many data records). Other examples of data structures are possible as well, in accordance with other embodiments.

"Computer-readable medium" or "computer storage medium", as used herein, refers to a non-transitory medium that stores instructions and/or data configured to perform one or more of the disclosed functions when executed. Data may function as instructions in some embodiments. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an application specific integrated circuit (ASIC), a programmable logic device, a compact disk (CD), other optical medium, a random access memory (RAM), a read only memory (ROM), a memory chip or card, a memory stick, solid state storage device (SSD), flash drive, and other media from which a computer, a processor or other electronic device can function with. Each type of media, if selected for implementation in one embodiment, may include stored instructions of an algorithm configured to perform one or more of the disclosed and/or claimed functions. Computer-readable media described herein are limited to statutory subject matter under 35 U.S.C. § 101.

"Logic", as used herein, represents a component that is implemented with computer or electrical hardware, a non-transitory medium with stored instructions of an executable application or program module, and/or combinations of these to perform any of the functions or actions as disclosed herein, and/or to cause a function or action from another logic, method, and/or system to be performed as disclosed herein. Equivalent logic may include firmware, a microprocessor programmed with an algorithm, a discrete logic (e.g., ASIC), at least one circuit, an analog circuit, a digital circuit, a programmed logic device, a memory device containing instructions of an algorithm, and so on, any of which may be configured to perform one or more of the disclosed functions. In one embodiment, logic may include one or more gates, combinations of gates, or other circuit components configured to perform one or more of the disclosed functions. Where multiple logics are described, it may be possible to incorporate the multiple logics into one logic. Similarly, where a single logic is described, it may be possible to distribute that single logic between multiple logics. In one embodiment, one or more of these logics are corresponding structure associated with performing the disclosed and/or claimed functions. Choice of which type of logic to implement may be based on desired system conditions or specifications. For example, if greater speed is a consideration, then hardware would be selected to implement functions. If a lower cost is a consideration, then stored instructions/executable application would be selected to implement the functions. Logic is limited to statutory subject matter under 35 U.S.C. § 101.

An "operable connection", or a connection by which entities are "operably connected", is one in which signals, physical communications, and/or logical communications may be sent and/or received. An operable connection may include a physical interface, an electrical interface, and/or a data interface. An operable connection may include differing combinations of interfaces and/or connections sufficient to allow operable control. For example, two entities can be operably connected to communicate signals to each other directly or through one or more intermediate entities (e.g., processor, operating system, logic, non-transitory computer-readable medium). Logical and/or physical communication channels can be used to create an operable connection.

"User", as used herein, includes but is not limited to one or more persons, computers or other devices, or combinations of these.

While the disclosed embodiments have been illustrated and described in considerable detail, it is not the intention to restrict or in any way limit the scope of the appended claims to such detail. It is, of course, not possible to describe every conceivable combination of components or methodologies for purposes of describing the various aspects of the subject matter. Therefore, the disclosure is not limited to the specific details or the illustrative examples shown and described. Thus, this disclosure is intended to embrace alterations, modifications, and variations that fall within the scope of the appended claims, which satisfy the statutory subject matter requirements of 35 U.S.C. § 101.

To the extent that the term "includes" or "including" is employed in the detailed description or the claims, it is intended to be inclusive in a manner similar to the term "comprising" as that term is interpreted when employed as a transitional word in a claim.

To the extent that the term "or" is used in the detailed description or claims (e.g., A or B) it is intended to mean "A or B or both". When the applicants intend to indicate "only A or B but not both" then the phrase "only A or B but not both" will be used. Thus, use of the term "or" herein is the inclusive, and not the exclusive use.

What is claimed is:

1. A non-transitory computer-readable medium that includes stored thereon computer-executable instructions that when executed by at least a processor of a computer cause the computer to:
   convert an audio-visual signal that includes speech by a human speaker into a set of time series signals that includes a video subset of time series signals for the video and an audio subset of time series signals for the audio;
   generate a set of residual time series signals from the set of time series signals and a set of estimates for the time series signals made by a machine learning model, wherein the machine learning model generates the estimates to be consistent with authentic speech by the human speaker;
   place residual values from one synchronous observation of the set of residual time series signals into a two-dimensional array that is divided into a video partition and an audio partition, wherein residual values generated for the video subset are placed within the video partition, and residual values generated for the audio subset are placed in the audio partition;
   perform a sequential analysis of the residual values across two dimensions of the two-dimensional array to detect an anomaly in the residual values; and
   in response to detection of the anomaly, generate an alert that deepfake content that misrepresents the human speaker or the speech is detected in the audio-visual signal.

2. The non-transitory computer-readable medium of claim 1, wherein the instructions further cause the processor to:
   convert the audio-visual signal into the video subset of time series signals by sampling time series signals from pixels of a frame of video in the audio-visual signal; and
   convert the audio-visual signal into the audio subset of time series signals by sampling time series signals from frequency ranges of the audio signal.

3. The non-transitory computer-readable medium of claim 1, wherein the instructions further cause the processor to perform the sequential analysis along one or more rows in a larger dimension of the two-dimensional array, wherein an individual row in the larger dimension of the two-dimensional array includes cells in both the video partition and the audio partition of the two-dimensional array.

4. The non-transitory computer-readable medium of claim 1, wherein the instructions further cause the processor to:
   generate the two-dimensional array such that
   (a) the video partition has a first dimension that is a first size of a first dimension of a pixel grid for a frame of video in the audio-visual signal and a second dimension of the video partition that is a second size of a second dimension of the pixel grid multiplied by a number of color channels per pixel, and
   (b) the audio partition has a dimension that is the size of one of the first or second dimension of the video partition; and
   place the residual values generated for the video subset into the video partition in cells corresponding to a location of the pixel within the pixel grid.

5. The non-transitory computer-readable medium of claim 1, wherein the instructions to perform a sequential analysis of the residual values across two dimensions of the two-dimensional array to detect an anomaly in the residual values further comprise instructions that when executed by at least the processor cause parallel processors to simultaneously perform sequential probability ratio tests across rows of the two-dimensional array and columns of the two-dimensional array, wherein the anomaly is detected when any one of the sequential probability ratio tests across rows or columns identifies an anomalous residual.

6. The non-transitory computer-readable medium of claim 1, further comprising instructions that when executed by at least the processor cause the processor to:
   resample one or more of the time series signals to cause the set of time series signals to be sampled at a uniform rate; and
   phase shift the time series signals to cause the observations of the signals to be synchronized.

7. The non-transitory computer-readable medium of claim 1, further comprising instructions that when executed by at least the processor cause the processor to:
   during streaming of the audio-visual signal, designate a reference segment of the set of time series signals to be representative of authentic speech by the human speaker; and
   before generating the set of residual time series signals, train the machine learning model to generate estimates of the time series signals that are consistent with the authentic speech based on the reference segment of the set of time series signals.

8. The non-transitory computer-readable medium of claim 1, further comprising instructions that when executed by at least the processor cause the processor to:
include, in the alert, one of a location of a pixel in which the anomaly occurred or a frequency range in which the anomaly occurred; and
include in the alert a timestamp at which the anomaly occurred.

9. A computing system, comprising:
at least one processor;
at least one memory operably connected to the processor; and
a non-transitory computer readable medium including instructions stored thereon that when executed by at least the processor cause the computing system to:
convert audio-visual content of a person delivering a speech into a set of time series signals;
generate residual time series signals of residuals that indicate an extent to which the time series signals differ from machine learning estimates of authentic delivery of the speech by the person;
place residual values from one synchronous observation of the residual time series signals into an array of residual values for a point in time;
perform a sequential analysis of the residual values of the array to detect an anomaly in the residual values for the point in time;
in response to detection of the anomaly, generate an alert that at least one of fake audio words or altered movements is detected in the audio-visual content.

10. The computing system of claim 9, wherein the instructions further cause the computing system to:
sample pixels of video in the audio-visual content to create a video subset of the time series signals that represent the video of the person; and
sample frequency ranges of the audio in the audio-visual content to create an audio subset of the time series signals that represents the audio of the speech;
wherein residual values generated from the video subset are placed into a video partition of the array, and residual values generated from the audio subset are placed into an audio partition of the array.

11. The computing system of claim 10, wherein the array is a two-dimensional array, and wherein the instructions further cause the computing system to place the residual values generated for the video subset into the video partition in cells corresponding to a location within a pixel grid represented by the residual value.

12. The computing system of claim 9, wherein the array is a two-dimensional array, and wherein the instructions to perform the sequential analysis of the residual values to detect an anomaly in the residual values at the point in time further causes the computing system to perform sequential probability ratio tests across rows of the two-dimensional array and columns of the two-dimensional array, wherein the anomaly is detected when any one of the sequential probability ratio tests across rows or columns identifies an anomalous residual.

13. The computing system of claim 9, wherein the instructions further cause the computing system to:
resample one or more of the time series signals to cause the set of time series signals to be sampled at a uniform rate; and
phase shift the time series signals to cause the observations of the signals to be synchronized.

14. The computing system of claim 9, wherein the instructions further cause the computing system to:
retrieve a reference set of time series signals that are representative of authentic speech by a human speaker in a reference audio-visual content; and
train a machine learning model to generate the machine learning estimates of authentic delivery of the speech based on the reference set of time series signals.

15. The computing system of claim 9, wherein the instructions further cause the computing system to:
include in the alert locations of pixels in which the anomaly occurred and a time at which the anomaly occurred; and
highlight the pixels in which the anomaly occurred in the audio-visual content to visually indicate the fake or altered movements detected in the audio-visual content.

16. A computer-implemented method, comprising:
converting audio-visual content of a person delivering a speech into a set of time series signals;
generating residual time series signals of residuals that indicate an extent to which the time series signals differ from machine learning estimates of authentic delivery of the speech by the person;
placing residual values from one synchronous observation of the residual time series signals into an array of residual values for a point in time;
performing a sequential analysis of the residual values of the array to detect an anomaly in the residual values for the point in time;
in response to detection of the anomaly, generating an alert that deepfake content is detected in the audio-visual content.

17. The computer-implemented method of claim 16, further comprising:
sampling pixels of video in the audio-visual content to create a video subset of the time series signals that represent the video of the person; and
sampling frequency ranges of the audio in the audio-visual content to create an audio subset of the time series signals that represents the audio of the speech;
wherein residual values generated from the video subset are placed into a video partition of the array, and residual values generated from the audio subset are placed into an audio partition of the array.

18. The computer-implemented method of claim 16, further comprising:
generating the array to be a two-dimensional array that has
(a) a video partition that has a first dimension of the video partition that is a first size of a first dimension of a pixel grid for a frame of video in the audio-visual content and a second dimension of the video partition that is a second size of a second dimension of the pixel grid multiplied by a number of color channels per pixel, and
(b) an audio partition that has a dimension that is one of the first or second dimension of the video partition; and
placing the residual values generated from a video subset into the video partition in cells corresponding to a location of the pixel within the pixel grid.

19. The computer-implemented method of claim 16, further comprising:
during streaming of the audio-visual content, designating a reference segment of the set of time series signals to be representative of authentic speech by a human speaker; and
before generating the residual time series signals, training a machine learning model to generate the machine learning estimates of authentic delivery of the speech based on the reference segment of the set of time series signals.

20. The computer-implemented method of claim 16, further comprising:
including in the alert a frequency range in which the anomaly occurred and an identifier for a frame of the audio-visual content at which the anomaly occurred; and
adding a warning to the audio-visual content at the frame at which the anomaly occurred to visually indicate the deepfake content.

\* \* \* \* \*